United States Patent
Yamada

(10) Patent No.: US 11,516,366 B2
(45) Date of Patent: Nov. 29, 2022

(54) IMAGE FORMING APPARATUS AND CONTROL METHOD FOR THE IMAGE FORMING APPARATUS FOR DISPLAYING A SCREEN FOR STOPPING A JOB

(71) Applicant: CANON KABUSHIKI KAISHA, Tokyo (JP)

(72) Inventor: Masayuki Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/348,310

(22) Filed: Jun. 15, 2021

(65) Prior Publication Data

US 2021/0314457 A1 Oct. 7, 2021

Related U.S. Application Data

(63) Continuation of application No. 16/231,088, filed on Dec. 21, 2018, now Pat. No. 11,064,085.

(30) Foreign Application Priority Data

Dec. 28, 2017 (JP) .............................. JP2017-254233

(51) Int. Cl.
*H04N 1/00* (2006.01)
*G06F 3/12* (2006.01)

(52) U.S. Cl.
CPC ....... *H04N 1/00925* (2013.01); *G06F 3/1205* (2013.01); *G06F 3/1259* (2013.01); *G06F 3/1273* (2013.01); *G06F 3/1274* (2013.01); *H04N 1/00384* (2013.01); *H04N 1/00413* (2013.01); *H04N 1/00474* (2013.01); *H04N 1/00477* (2013.01); *G06F 3/126* (2013.01)

(58) Field of Classification Search
CPC ........... H04N 1/00474; H04N 1/00925; H04N 1/00413; H04N 1/00384; H04N 1/00477; G06F 3/1205; G06F 3/1273; G06F 3/1274

See application file for complete search history.

(56) References Cited

U.S. PATENT DOCUMENTS

| | | | |
|---|---|---|---|
| 6,894,792 B1 * | 5/2005 | Abe ...................... | G06F 3/1207 358/1.13 |
| 7,456,980 B2 * | 11/2008 | Kuboki .............. | H04N 1/00002 358/1.13 |
| 10,313,541 B2 * | 6/2019 | Morii .................. | H04N 1/00506 |
| 2005/0052679 A1 * | 3/2005 | Green ................... | G06F 3/1263 358/1.14 |

(Continued)

*Primary Examiner* — Nicholas Pachol
(74) *Attorney, Agent, or Firm* — Canon U.S.A., Inc. IP Division

(57) ABSTRACT

An image processing apparatus includes a reading unit configured to read an original, a transmission unit configured to transmit image data to an external apparatus, a printing unit configured to print an image, a display unit configured to display the image, and a control unit configured to suspend a job executed by the printing unit in response to a selection of a key for suspending a currently executed job, display a list of jobs on the display unit, and cancel a job selected by a user from the displayed list of the jobs. The control unit displays a list of transmission jobs for the transmission unit to transmit the image data generated when the reading unit reads the original in response to the selection of the key during display of a main menu screen for accepting a selection of a function to be used.

27 Claims, 23 Drawing Sheets

(56) References Cited

U.S. PATENT DOCUMENTS

| | | | |
|---|---|---|---|
| 2006/0171513 A1* | 8/2006 | Yoshida | H04N 1/00432 379/88.13 |
| 2008/0007482 A1* | 1/2008 | Morioka | H04N 13/31 345/1.1 |
| 2008/0013123 A1* | 1/2008 | Yoshioka | G03G 15/502 358/1.15 |
| 2008/0144071 A1* | 6/2008 | Uchikawa | H04N 1/4406 358/1.14 |
| 2009/0059286 A1* | 3/2009 | Yamaguchi | H04N 1/00472 358/1.15 |
| 2009/0195822 A1* | 8/2009 | Hiraike | H04N 1/00413 358/1.15 |
| 2009/0225343 A1* | 9/2009 | Tominaga | G06F 3/1263 358/1.9 |
| 2010/0177345 A1* | 7/2010 | Watanabe | G06F 3/126 358/1.15 |
| 2010/0218093 A1* | 8/2010 | Sakamoto | H04N 1/00915 715/274 |
| 2011/0122441 A1* | 5/2011 | Shiohara | G06F 3/1277 358/1.15 |
| 2011/0161794 A1* | 6/2011 | Shiohara | G06F 3/1273 715/209 |
| 2013/0070282 A1* | 3/2013 | Takahashi | G06F 3/1285 358/1.14 |
| 2014/0029034 A1* | 1/2014 | Toriyama | H04N 1/00949 358/1.13 |
| 2014/0168694 A1* | 6/2014 | Hiruma | H04N 1/00206 358/1.15 |
| 2015/0103376 A1* | 4/2015 | Saeda | G06F 3/126 358/1.15 |
| 2015/0244899 A1* | 8/2015 | Cheng | H04N 1/32678 358/1.14 |
| 2016/0004488 A1* | 1/2016 | Hirose | G06F 3/1205 358/1.15 |
| 2016/0173728 A1* | 6/2016 | Kasuya | H04N 1/33376 358/1.14 |
| 2016/0366293 A1* | 12/2016 | Ono | H04N 1/00474 |
| 2017/0013139 A1* | 1/2017 | Suzuki | G06F 3/1288 |
| 2017/0013170 A1* | 1/2017 | Sato | H04N 1/00413 |
| 2017/0039013 A1* | 2/2017 | Tsunekawa | G06F 3/1285 |
| 2017/0052745 A1* | 2/2017 | Kanematsu | G06F 3/1238 |
| 2019/0182399 A1* | 6/2019 | Yasukawa | H04N 1/00344 |
| 2019/0222712 A1* | 7/2019 | Nakamura | G06Q 10/10 |

* cited by examiner

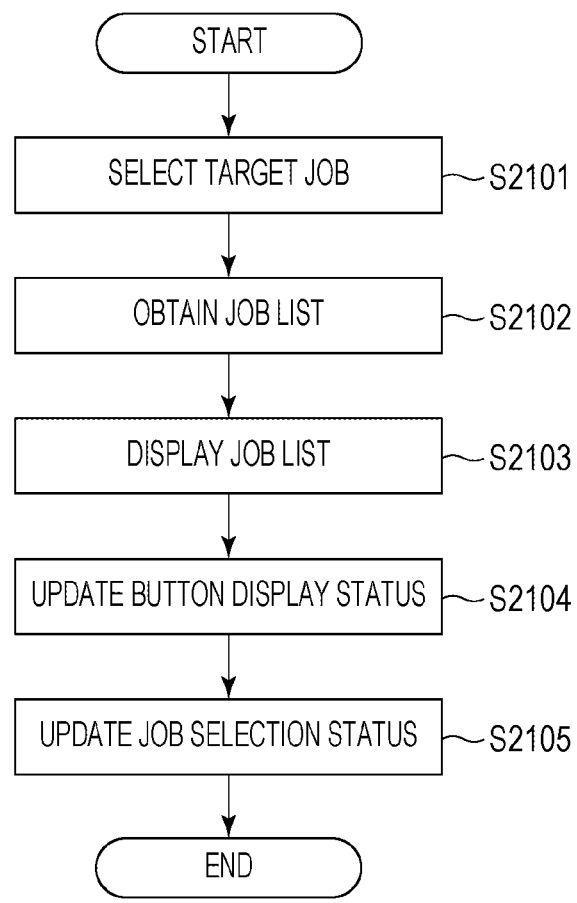

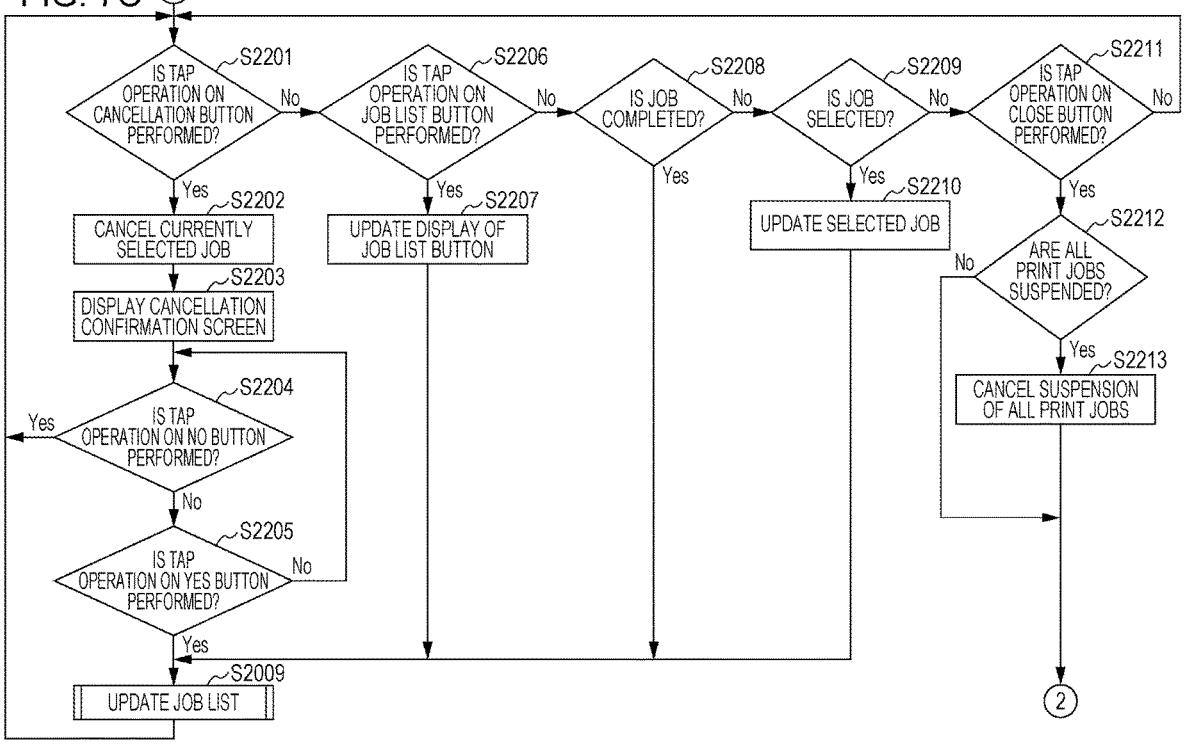

FIG. 11A

| JOB ID | ACCEPTED TIME | NUMBER OF PAGES | NUMBER OF COPIES | STATUS |
|---|---|---|---|---|
| 5 | 11:04:20 | 3 | 100 | SUSPENDED |
| 6 | 11:10:03 | 10 | 5 | SUSPENDED |

FIG. 11B

| JOB ID | ACCEPTED TIME | DESTINATION | STATUS |
|---|---|---|---|
| 12 | 13:20:10 | 0312345678 | BEING TRANSMITTED |
| 14 | 13:21:30 | abc@def.ghi.jp | STANDBY |

FIG. 11C

| JOB ID | JOB NAME | ACCEPTED TIME | USER NAME | NUMBER OF PAGES | NUMBER OF COPIES | STATUS | WAITING TIME |
|---|---|---|---|---|---|---|---|
| 5 | COPY | 11:04:20 | ----- | 3 | 100 | SUSPENDED | 3 |
| 6 | COPY | 11:10:03 | ----- | 10 | 5 | SUSPENDED | 10 |
| 7 | xxx.doc | 11:11:23 | xyz | 20 | 1 | SUSPENDED | 10 |

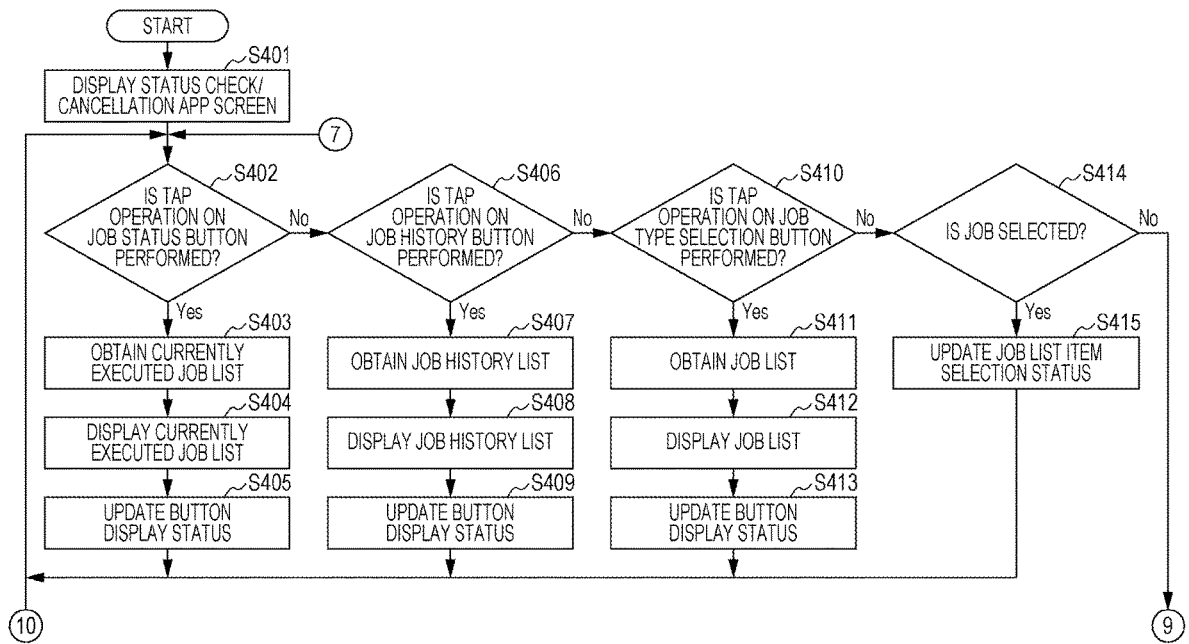
FIG. 14A1

FIG. 14A2
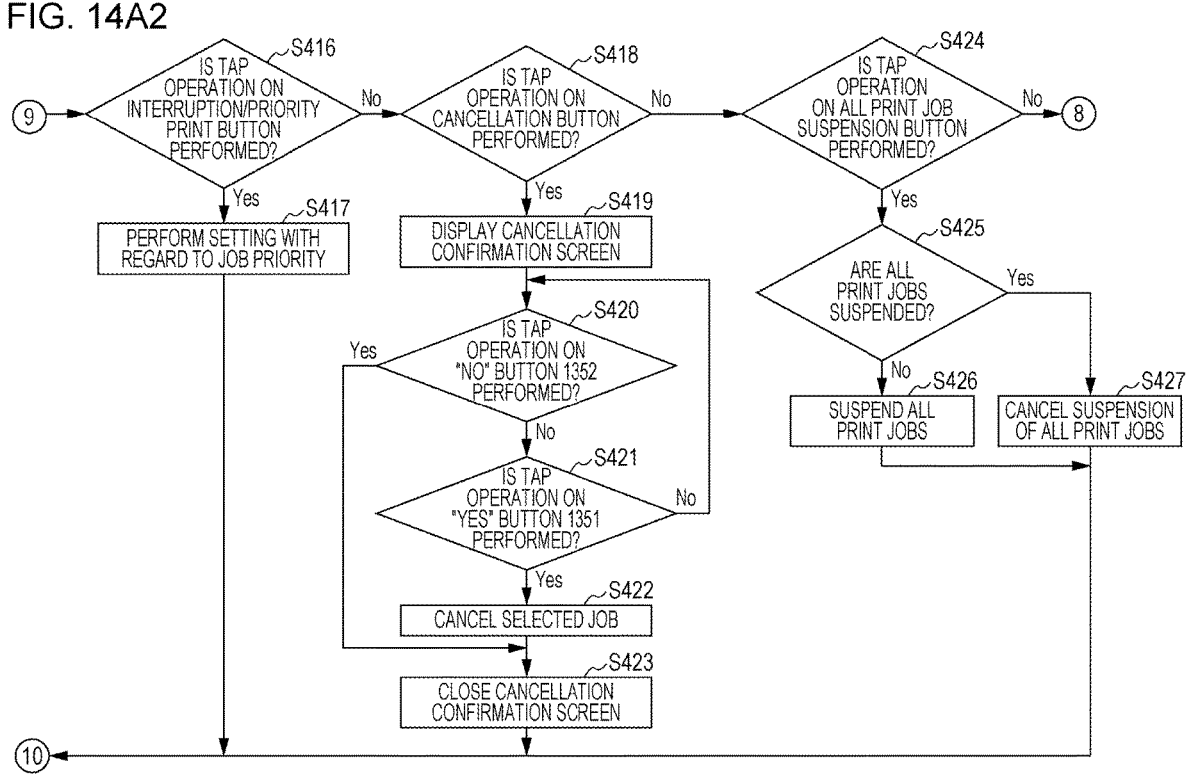

FIG. 16

|  | | JOB TYPE | | | | | | | |
|---|---|---|---|---|---|---|---|---|---|
|  | | COPY | PRINT | FAX TRANSMISSION | FAX RECEPTION | E-MAIL TRANSMISSION | BOX SAVING | BOX PRINT | REPORT PRINT |
| JOB TYPE SELECTION BUTTON DISPLAY | PRINTING | ✓ | ✓ |  | ✓ |  |  | ✓ | ✓ |
| | COPY | ✓ | | | | | | | |
| | TRANSMISSION | | | ✓ | | ✓ | | | |
| | FAX TRANSMISSION | | | ✓ | | | | | |
| | RECEPTION | | | | ✓ | | | | |
| | SAVING | | | | | | ✓ | | |

IMAGE FORMING APPARATUS AND CONTROL METHOD FOR THE IMAGE FORMING APPARATUS FOR DISPLAYING A SCREEN FOR STOPPING A JOB

CROSS-REFERENCE TO RELATED APPLICATIONS

This application is a continuation application of U.S. patent application Ser. No. 16/231,088 filed on Dec. 21, 2018 which claims the benefit of Japanese Patent Application No. 2017-254233 filed Dec. 28, 2017, both of which are hereby incorporated by reference herein in their entirety.

BACKGROUND

Field

The present disclosure relates to an image forming apparatus and a technology for controlling a user interface for operating the image forming apparatus.

Description of the Related Art

An image processing apparatus having a plurality of functions such as copying, scanning, and facsimile (FAX) transmission is provided with a stop key for suspending a currently executed job. When a user presses a stop key in an image processing apparatus described in Japanese Patent Laid-Open No. 2000-76083, the image processing apparatus can suspend print jobs such as copying and printing. Then, a job to be cancelled is selected from a list of the suspended jobs.

In a case where the user presses the stop key during the display of a setting screen for jobs, it is conceivable that the user desires to suspend the job that can be set on the currently displayed screen. For this reason, in a case where the stop key is pressed during the display of a setting screen for a copy job, the image processing apparatus suspends the copy job and displays a list of the copy jobs.

On the other hand, with regard to a transmission job such as the FAX transmission, when the transmission job is suspended during the transmission of image data, a communication with a transmission destination of the image data is disconnected while the transmission job is suspended, and the transmission job is not to be resumed in some cases. For this reason, in a case where the stop key is pressed during the display of a setting screen for the transmission jobs, the image processing apparatus displays a list of the transmission jobs without suspending the transmission jobs.

The user may press the stop key in some cases in a state in which a main menu screen, which is to be displayed while the image processing apparatus stands by or immediately after login processing is performed, is displayed. For example, the above-described cases include a case where, after the user presses a start key to start a job, the user temporarily leaves a place in front of the image processing apparatus and the like. In order for the user to cancel the job, when the user comes back to the place in front of the image processing apparatus, the main menu screen is displayed on the display.

SUMMARY

According to an embodiment, an image processing apparatus is provided and includes a reading unit configured to read an original, a transmission unit configured to transmit image data to an external apparatus, a printing unit configured to print an image, a display unit configured to display the image, and a control unit configured to suspend a job executed by the printing unit in response to a selection of a key for suspending a currently executed job, display a list of jobs on the display unit, and cancel a job selected by a user from the displayed list of the jobs, in which the control unit displays a list of transmission jobs for the transmission unit to transmit the image data generated when the reading unit reads the original in response to the selection of the key during display of a main menu screen for accepting a selection of a function to be used.

Further features will become apparent from the following description of exemplary embodiments with reference to the attached drawings.

BRIEF DESCRIPTION OF THE DRAWINGS

FIG. 7B is a flow chart illustrating update processing of a job list in the image processing apparatus.

FIG. 7C is a flow chart illustrating processing executed after the display of the job list in the image processing apparatus.

FIGS. 11A, 11B, and 11C illustrate information obtained from a job processing unit in the image processing apparatus.

FIG. 14A1 and FIG. 14A2 are flow charts illustrating processing executed by a status check/cancel app in the image processing apparatus.

FIG. 16 illustrates a correspondence relationship between items of job type selection buttons and job types set as targets in the image processing apparatus.

DESCRIPTION OF THE EMBODIMENTS

Hereinafter, an example of an image processing apparatus functioning as a job processing apparatus will be described with reference to the drawings.

In a case where a user presses a stop key during the display of a main menu screen, it may not be clear which one of a print job and a transmission job the user desires to cancel. In view of the above, the image processing apparatus suspends the print job that can be suspended. The currently suspended print job is not executed until the user instructs resumption of the print job. For this reason, even if the user does not promptly select the job to be suspended, the execution of the job to be suspended is not completed. On the other hand, since the transmission job is not suspended, while the user selects the transmission job to be suspended, the execution of the transmission job may be completed in some cases. In view of the above, in order that the user promptly selects the transmission job desired to be suspended at the time of the press of the stop key, during the display of the main menu screen, a screen for making it easy to select the transmission job that is not suspended at the time of the press of the stop key is to be displayed.

According to an aspect of the present exemplary embodiment, it is aimed at displaying a screen where the transmission job that is not suspended can be promptly cancelled in a case where the stop key is pressed on the main menu screen. Descriptions on a configuration thereof will be hereinafter provided.

Figure 1:
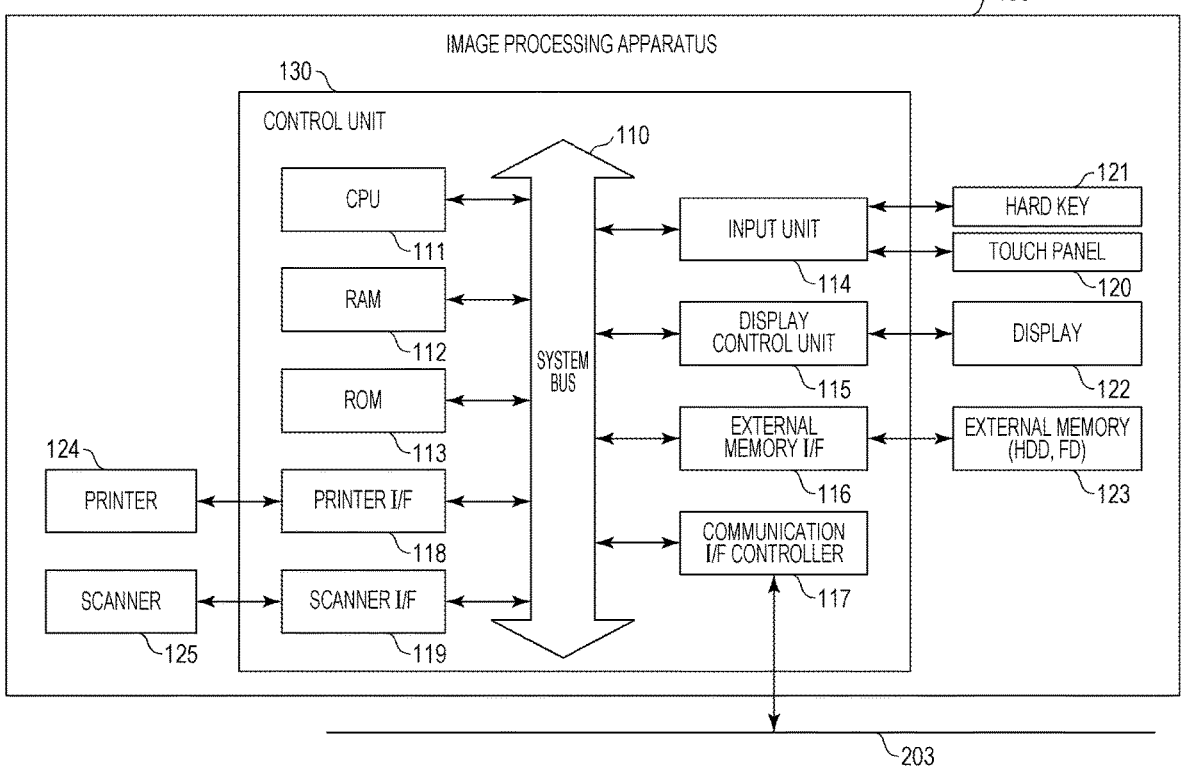
FIG. 1 is a block diagram illustrating a hardware configuration of an image processing apparatus according to an exemplary embodiment described in the present specification.

FIG. 1 is a block diagram illustrating a hardware configuration of an example of an image processing apparatus 100 functioning as a job processing apparatus according to the exemplary embodiment.

In FIG. 1, a control unit 130 is constituted by a central processing unit (CPU) 111, a random access memory (RAM) 112, a read only memory (ROM) 113, an input unit 114, a display control unit 115, an external memory interface (I/F) 116, a communication I/F controller 117, a printer I/F 118, and a scanner I/F 119. These units are connected to a system bus 110, and data exchange is performed via the system bus 110. A touch panel 120, a hard key 121, a display 122, an external memory 123, a printer 124, and a scanner 125 are connected to the control unit 130.

The ROM 113 is a non-volatile memory and respectively stores image data and other data, various programs for the CPU 111 to operate, and the like in predetermined areas. The RAM 112 is a volatile memory and is used as a main memory of the CPU 111 and a temporary storage area such as a work area. The CPU 111 uses the RAM 112 as a work memory in accordance with the programs stored in the ROM 113 and controls the respective units of the image processing apparatus 100, for example. It should be noted that the programs for the CPU 111 to operate is not limited to the programs stored in the ROM 113, and the programs may also be previously stored in an external memory (such as a hard disc drive) 123.

The input unit 114 accepts a user operation and generates a control signal in accordance with the operation to be supplied to the CPU 111. The input unit 114 is connected to the touch panel 120 and the hard key 121 as an input device configured to accept the user operation. It should be noted that the touch panel 120 is, for example, an input device configured to output coordinate information in accordance with a contact position with respect to an input unit having a planar structure. A touch panel based on any one of various methods such as a resistive film method, a capacitance method, a surface acoustic wave method, an infrared method, an electromagnetic induction method, an image recognition method, and an optical sensor method may also be used. The hard key 121 is an input device that can be physically pressed such as a numeric key, a start key, or a stop key. The CPU 111 controls the respective units of the image processing apparatus 100 in accordance with the programs on the basis of control signals that are generated in and supplied from the input unit 114 in accordance with the user operation performed with respect to the input device. With this configuration, it is possible to cause the image processing apparatus 100 to perform the operation in accordance with the user operation.

The display control unit 115 outputs a display signal for causing the display 122 to display an image. For example, the display control signal generated by the CPU 111 in accordance with the program is supplied to the display control unit 115. The display control unit 115 generates the display signal on the basis of this display control signal to be output to the display 122. For example, the display control unit 115 displays a graphical user interface (GUI) screen constituting a GUI on the display 122 on the basis of the display control signal generated by the CPU 111.

The touch panel 120 is constituted in an integrated manner with the display 122. For example, the touch panel 120 is constituted in a manner that its light transmission does not disturb the display performed by the display 122 and attached to an upper layer of a display surface of the display 122. Then, input coordinates on the touch panel 120 are associated with display coordinates on the display 122. With this configuration, it is possible to constitute such a GUI as if the user may directly operate the screen displayed on the display 122.

The external memory 123 such as a hard disk drive, a floppy disk, a compact disc (CD), a digital versatile disc (DVD), or a memory card can be mounted to the external memory I/F 116, for example. The external memory 123 reads data from the mounted external memory 123 and writes data with respect to the external memory 123 on the basis of the control of the CPU 111. The communication I/F controller 117 performs a communication with respect to a network 203 of various types such as a local area network (LAN), the Internet, a public line, a wired network, and a wireless network on the basis of the control of the CPU 111, for example. The scanner I/F 119 controls image input from the scanner 125. The printer I/F 118 controls image output to the printer 124.

Figure 2:
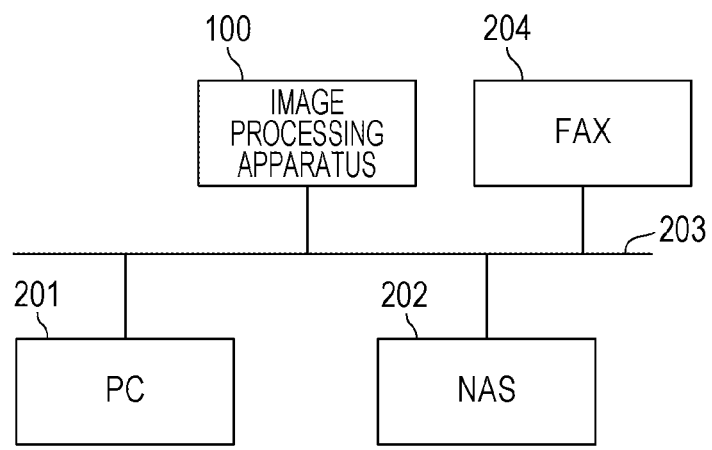
FIG. 2 is a block diagram illustrating an example of a configuration of a network system in which the image processing apparatus operates.

FIG. 2 is a block diagram illustrating an example of a configuration of a network system to which the image processing apparatus 100 of FIG. 1 is connected. In FIG. 2, a personal computer (PC) 201 is an information processing apparatus configured to input a print job to the image processing apparatus 100 and receive an image generated in the image processing apparatus 100. When the print job is input from the PC 201 to the image processing apparatus 100, the image processing apparatus 100 processes the input print job, and the printer 124 outputs a sheet on which the image has been formed. As an alternative to the above-described configuration, the image processing apparatus 100 transmits image data generated when the scanner 125 reads an original to the PC 201 via the network 203. A network attached storage (NAS) 202 is a storage device that stores the image data generated when the scanner 125 reads the original. A facsimile device (FAX) 204 is a device configured to receive the image data generated when the scanner 125 reads an original and transmit the image data to the image processing apparatus 100. A connection mode between the image processing apparatus 100 and the FAX 204 may be a connection mode using the public line and may also be a connection mode using the Internet.

Figure 3:
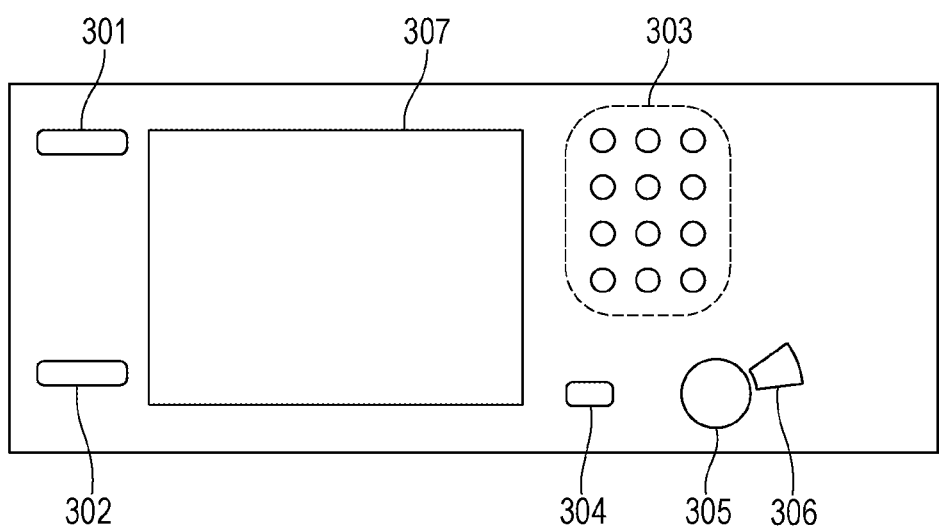
FIG. 3 illustrates a configuration of an operation unit of the image processing apparatus.

FIG. 3 is a schematic diagram illustrating configurations of the touch panel 120, the hard key 121, and the display 122. FIG. 3 illustrates hard kays 301 to 306 that constitute the hard key 121. The main menu key 301 is a key for displaying the main menu screen for selecting a function to be used on the display 122. The status check/cancellation key 302 is a key for displaying a "status check/cancellation" screen on the display 122. The "status check/cancellation" screen is a screen for displaying the currently executed jobs in a list or displaying an already executed job list. The job selected by the user can be cancelled from the "status check/cancellation" screen displayed in the display 122. The cancellation of the job refers to deletion of the currently executed job or the job to be executed afterwards. The numeric key 303 constituted by the respective hard keys is used for inputting a numeric value such as the number of copies, a telephone number, and the like. The reset key 304 is a key used for instructing to return a setting value of the job set by the user to a previously determined initial value. A start key 305 is a key used for an instruction when the job is input or the scanning is to be started. A stop key 306 is a key for instructing suspension of the job. The job suspended when the user presses the stop key 306 can be resumed by a user instruction. When the job that is ready to be executed is suspended, even when the currently executed job is completed, it is possible to control in a manner that the execution of the job that is ready to be executed is not started. A structure 307 is obtained by overlapping the touch panel 120 and the display 122 with each other.

It should be noted that, according to the present exemplary embodiment, the respective keys 301 to 306 are realized as hard keys as illustrated in FIG. 3. The respective keys 301 to 306 may also be displayed on the display 122 and realized as soft keys where the press of the key is detected by an operation of the touch panel 120.

Figure 4:
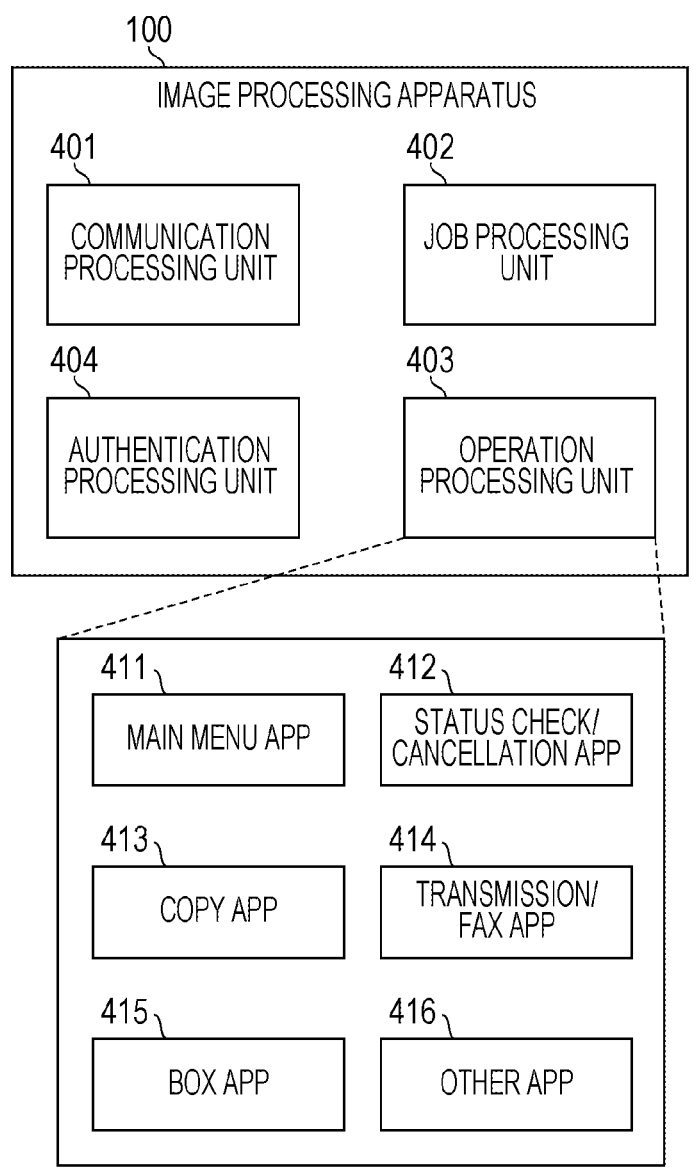
FIG. 4 is a block diagram illustrating a function module configuration of the image processing apparatus.

FIG. 4 is a block diagram illustrating an example of a function of the image processing apparatus 100 illustrated in FIG. 1. The image processing apparatus 100 includes a communication processing unit 401, a job processing unit 402, an operation processing unit 403, and an authentication processing unit 404 as its functions. The respective functional units are realized when the CPU 111 reads out the program stored in the ROM 113 or the external memory 123 into the RAM 112 to be executed.

The communication processing unit 401 executes an analysis on communication contents transmitted to and received from the PC 201, the NAS 202, the FAX 204, and the like connected to the network 203 via the communication I/F controller 117 and a communication control (FIG. 1). The job processing unit 402 performs the processes of the various jobs executed in the image processing apparatus 100. Specifically, the printer 124 is controlled to execute the print job, the scanner 125 is controlled to execute a scan job, and the communication I/F controller 117 is controlled to execute the transmission job. In addition, control for stopping processing and cancellation processing of the above-described various jobs is performed.

The operation processing unit 403 controls the display control unit 115 to display various information with respect to the user on the display 122. Furthermore, the operation processing unit 403 receives an operation instruction from the user which is input from the hard key 121 and the touch panel 120 via the input unit 114 and processes the operation instruction. The authentication processing unit 404 performs processing related to authentication and management of the user who uses the image processing apparatus 100 in accordance with a login/logout request.

The operation processing unit 403 includes applications (411 to 416) for providing functions using the image processing apparatus 100 to the user. The respective applications provide the function to the user independently or in collaboration with other applications.

The main menu app 411 presents a list of the applications that can be used in the image processing apparatus 100 to the user. The main menu app 411 is used for the user to execute the selected application. The status check/cancellation app 412 is used for displaying a job execution status and cancelling the currently executed job. The copy app 413 is used for realizing a copy function for outputting the image read from the scanner 125 from the printer 124. The transmission/FAX app 414 is used for realizing a transmission/FAX function for transmitting the image read from the scanner 125 through the network 203. The box app 415 is used for realizing a box function for saving the image read from the scanner 125 in the external memory 123 or a device (for example, the NAS 202) connected to the network 203. In addition to the above, an application exists for each function to be provided to the user (416). The image processing apparatus 100 can execute the jobs of the plurality of types since the image processing apparatus 100 includes the applications of the plurality of types.

Figure 5:
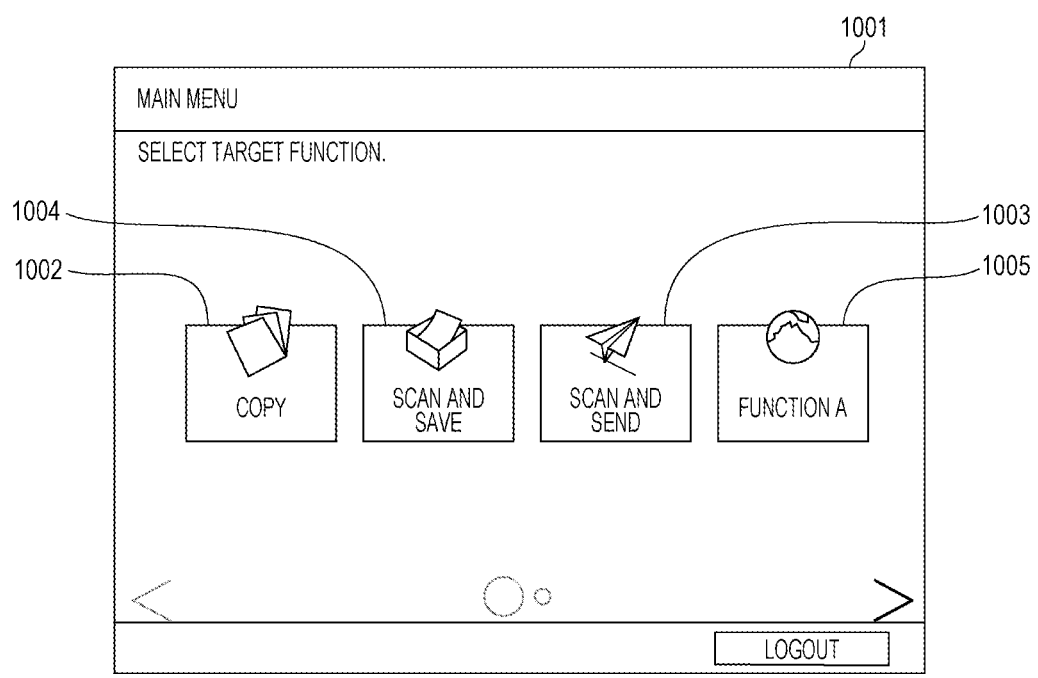
FIG. 5 illustrates an example of a screen configuration of a main menu displayed on a display of the image processing apparatus.
Figure 6:
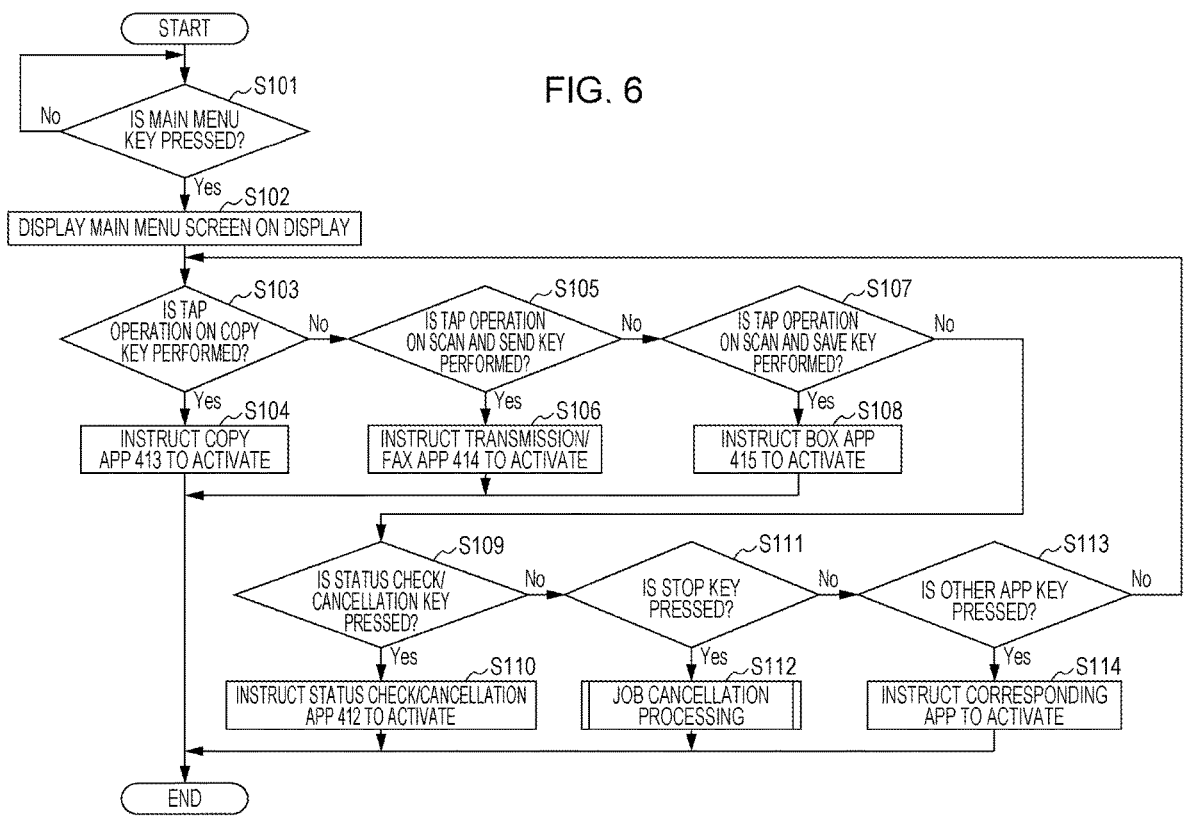
FIG. 6 is a flow chart illustrating processing executed when a user instruction is accepted on a main menu screen in the image processing apparatus.

FIG. 5 illustrates an example of a "main menu" screen 1001 displayed on the display 122. FIG. 6 is a flow chart illustrating processing of the main menu app 411. Hereinafter, an operation of the main menu app 411 will be described with reference to the flow chart of FIG. 6. It should be noted that the contents of the respective flow charts according to the following respective exemplary embodiments are recorded in the ROM 113 as a program code. As an alternative to the above-described configuration, a mode may also be adopted in which the program code recorded in the external memory 123 is read into the RAM 112, and the program code downloaded through the network 203 is temporarily saved in the RAM 112. The CPU 111 reads the programs recorded in the ROM 113 and the RAM 112 and executes the respective processes described in the programs. As a result, the contents described in the respective flow charts are realized. When a power supply of the image processing apparatus 100 turns on or any one of screens is displayed on the display 122, the processing described in the flow chart of FIG. 6 is started in accordance with the press of the main menu key 301. After the user logs in the image processing apparatus 100, when the "main menu" screen 1001 is displayed in the first place, the processing described in FIG. 6 may also be executed.

The main menu app 411 detects the press of the main menu key 301 (S101).

Next, the main menu app 411 displays the "main menu" screen 1001 on the display 122 (S102). The "main menu" screen 1001 is a screen as illustrated in FIG. 5 for selecting a function to be used by the user. As illustrated in FIG. 5, a "copy" key 1002, a "scan and send" key 1003, a "scan and save" key 1004, an another app key 1005, and the like are arranged on the "main menu" screen 1001. When the user performs a tap operation on a displayed key to be selected, it is possible to use the selected application.

The main menu app 411 determines whether or not the "copy" key 1002 is selected (S103). In a case where the tap operation on the "copy" key 1002 is performed, the main menu app 411 calls out the copy app 413 and ends the processing described in this flow chart. In a case where the copy key is not selected, the main menu app executes the processing described in S105.

Next, the main menu app 411 determines whether or not the tap operation on the "scan and send" key 1003 is performed (S105). In a case where the tap operation on the "scan and send" key 1003 is performed, the main menu app 411 calls out the transmission/FAX app 414 (S106). In a case where the tap operation on the "scan and send" key 1003 is not performed, the main menu app 411 determines whether or not the tap operation on the "scan and send" key 1003 is performed (S107). In a case where the tap operation on the "scan and save" key 1004 is performed, the main menu app 411 calls out the box app 415 (S108). The main menu app 411 determines whether or not the status check/cancellation key 302 is pressed (S109). In a case where the status check/cancellation key 302 is pressed, the main menu app 411 calls out the status check/cancellation app 412 (S110). In a case where the status check/cancellation key 302 is not pressed, the main menu app 411 determines whether or not the stop key 306 is pressed (S111). In a case where the stop key 306 is pressed, the main menu app 411 executes job cancellation processing (S112). A detail of the processing executed in S112 will be described below with reference to FIG. 7A, FIG. 7B, and FIG. 7C. In a case where the stop key 306 is not pressed, the main menu app 411 determines whether or not the other app key such as, for example, the function A key 1005, is selected (S113). In a case where the other app key is selected, the main menu app 411 calls out the selected application (S411). In a case where the other app key is not selected, the main menu app 411 returns the processing to S102. After the main menu app 411 calls out the selected application, the processing described in this flow chart is ended.

Herein, the processing when the stop key is pressed on the main menu screen according to the present exemplary embodiment and a screen displayed on the display 122 at this time will be described.

Figure 7A:
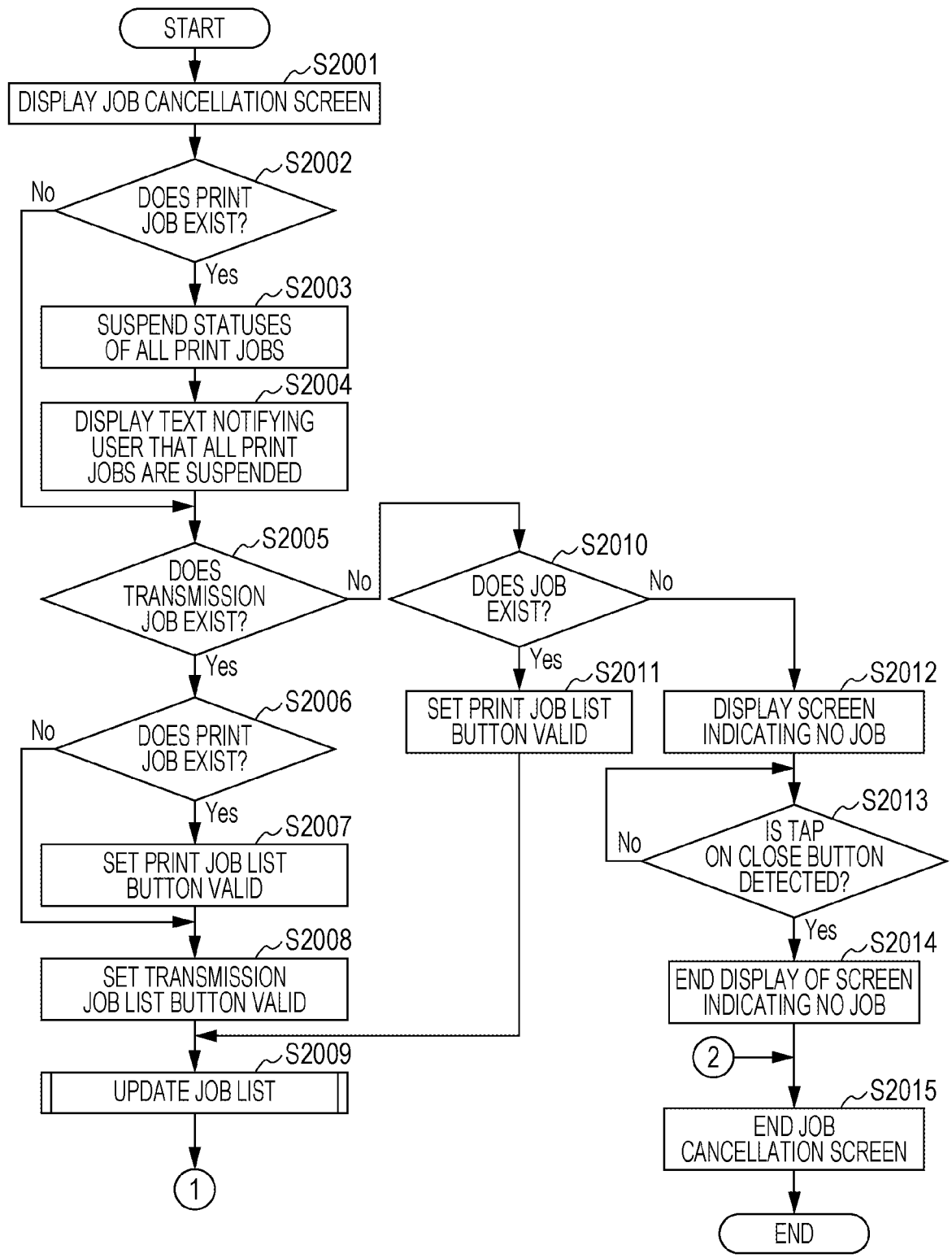
FIG. 7A is a flow chart illustrating processing executed when a stop key is pressed during the display of the main menu screen in the image processing apparatus.

FIG. 7A, FIG. 7B, and FIG. 7C are flow charts illustrating processing executed by the main menu app 411 in S112 of FIG. 6. FIG. 8A, FIG. 8B, FIG. 8C, FIG. 8D, FIG. 8E, and FIG. 8F are explanatory diagrams for describing a screen displayed in accordance with the press of the stop key 306 while the display 122 displays the "main menu" screen 1001.

The processing described in the flow charts illustrated in FIG. 7A, FIG. 7B, and FIG. 7C is realized when the CPU 111 develops the program stored in the ROM 113 or the external memory 123 into the RAM 112 to be executed. According to the present exemplary embodiment, the descriptions will be provided while the main menu app 411 executes the processing, but another application or a dedicated-use application at the time of the press of the stop key may also execute the following processing.

Figure 8A:
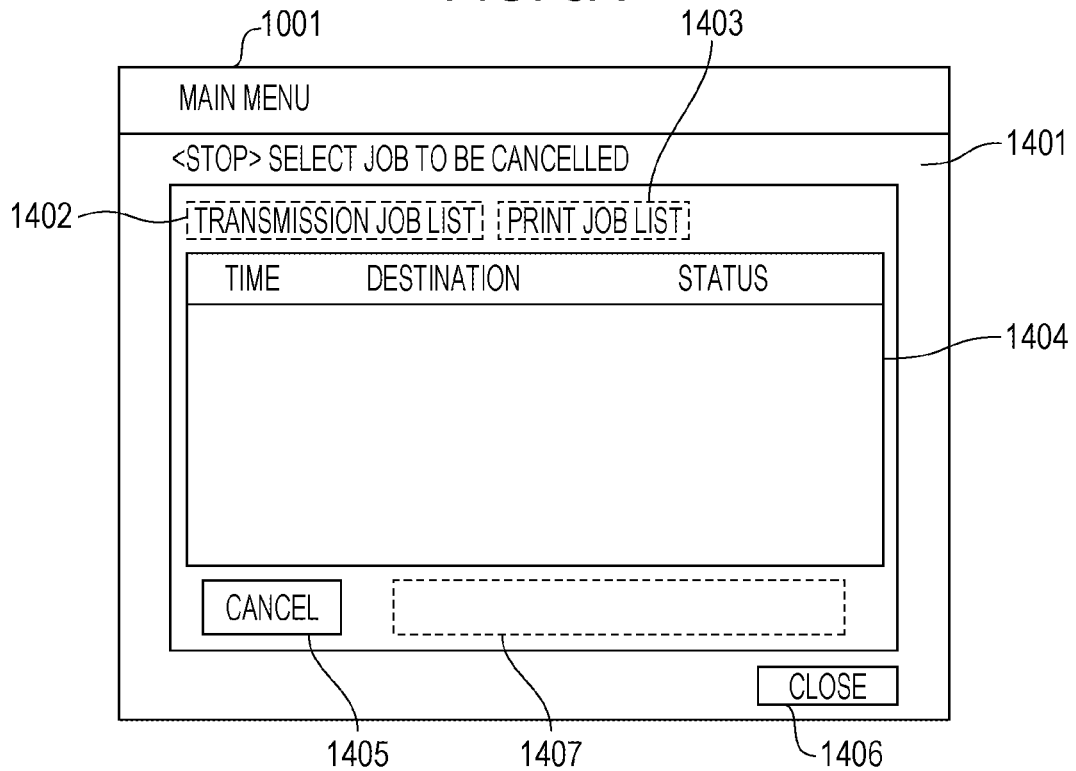
FIGS. 8A and 8B illustrate an example of a screen displayed when the stop key is pressed during the display of the main menu screen in the image processing apparatus.

The main menu app 411 displays a job cancellation screen 1401 on the display 122 (S2001). FIG. 8A illustrates an example of a screen displayed in S2001 on the display 122. A "transmission job list" button 1402 is a button for displaying a list of the transmission jobs corresponding to the cancellation target. A "print job list" button 1403 is a button for displaying the print jobs set as cancellation targets in a list. A job list area 1404 is an area where the list of the jobs set as the cancellation targets is displayed. A cancellation button 1405 is a button for cancelling the job selected from the jobs displayed in the job list area 1404. An area 1407 is an area where a message to the user is displayed. A close button 1406 is a button for closing the job cancellation screen. In S2001, the "transmission job list" button 1402 and the "print job list" button 1403 are set to be invalid and displayed by using a broken line or displayed in a graying-out manner. Both the job list area 1404 and the area 1407 are not displayed.

The main menu app 411 determines whether or not the print job exists in the job processing unit 402 (S2002). The main menu app 411 obtains the presence or absence of the print job from the job processing unit 402 and executes the determination in S2002. The print job includes a copy job, a print job for printing the image data transmitted from the PC, a box print job for printing the image data obtained from the external memory 123 or the NAS 202, or the like. In a case where the print job exists in the job processing unit 402, the main menu app 411 executes the processing in S2003 and subsequent steps. In a case where the print job does not exist in the job processing unit 402, the main menu app 411 executes the processing in S2005 and subsequent steps which will be described below.

The main menu app 411 instructs the job processing unit 402 to suspend all the print jobs, and a flag indicating that all the print jobs are suspended is set in the RAM 112 (S2003). The job processing unit 402 suspends the print job held by the job processing unit 402 in accordance with the instruction from the main menu app 411.

The main menu app 411 displays an indication that all the print jobs are suspended in the area 1407 (S2004).

The main menu app 411 obtains information related to the presence or absence of the transmission job from the job processing unit 402 and determines the presence or absence of the transmission job (S2005). The transmission job refers, for example, to a job for performing FAX transmission of the image data generated when the scanner 125 scans the original or a job for transmitting the image data to another information processing apparatus. In a case where the transmission job exists, the main menu app 411 executes the processing in S2006 and subsequent steps. In a case where the transmission job does not exist, the main menu app executes the processing in S2010 and subsequent steps.

In S2006, the main menu app 411 obtains information related to the presence or absence of the print job from the job processing unit 402 to determine the presence or absence of the print job. In S2006, it is supposed that the main menu app 411 performs processing similar to S2002. In S2006, a flag indicating the presence or absence of the print job may be set in the RAM 112, and the main menu app 411 refers to the flag in S2006 to determine the presence or absence of the print job. In a case where the print job exists, the main menu app 411 sets the print job list button 1403 to be valid and sets the "print job list" button 1403 in a non-selected state (S2007). In S2007, the setting of the "print job list" button 1403 to be valid means that the broken line or the graying-out display of the "print job list" button is cancelled, and the tap operation on the "print job list" button 1403 from the user is accepted. Thereafter, the main menu app 411 executes processing which will be described later in S2008.

In S2006, in a case where the print job does not exist, the main menu app 411 executes the processing described in S2008. In S2008, the main menu app 411 sets the "transmission job list" button 1402 to be valid and sets the transmission job list" button 1402 in a selected state. The setting of the "transmission job list" button 1402 to be valid means that the broken line or the graying-out display of the "transmission job list" button 1402 is cancelled, and the tap operation on the transmission job list" button 1402 from the user is to be accepted.

Thereafter, the main menu app 411 performs processing that will be described below and updates the list of the jobs set as the cancellation targets displayed in the job list area 1404 (S2009). Then, the main menu app 411 ends the processing described in this flow chart.

Figure 8B:
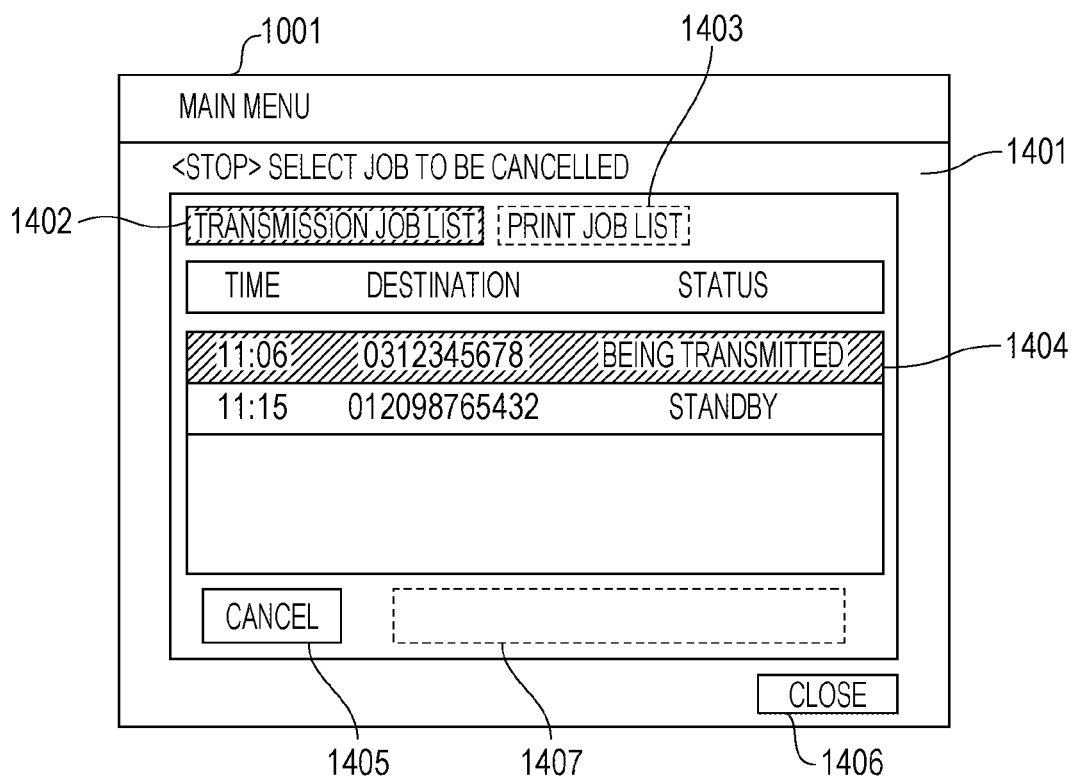

In a case where it is determined in S2006 that the transmission job exists and it is determined in S2007 that the print job does not exist, a screen illustrated in FIG. 8B is displayed on the display 122. On the screen 1401 illustrated in FIG. 8B, the "transmission job list" button 1402 is set to be valid, and the "print job list" button 1403 is set to be invalid. That is, even when the user performs the tap operation on the "print job list" button 1403, the list displayed in the job list area 1404 is not switched.

Figure 8C:
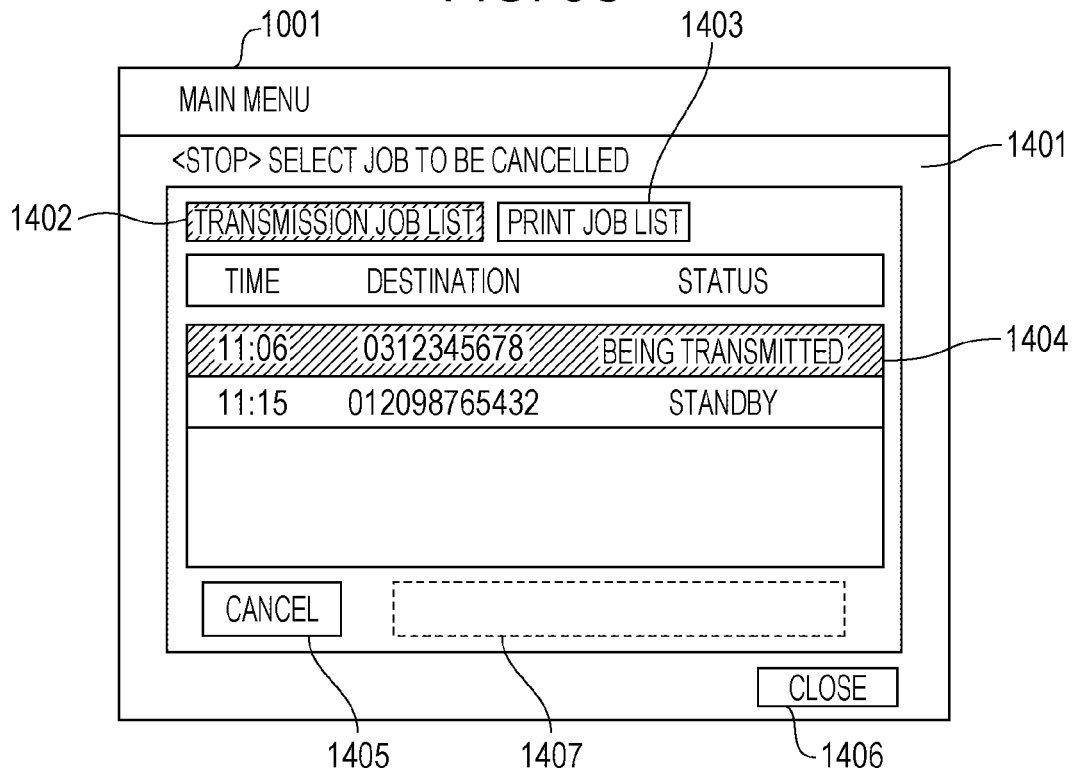
FIGS. 8C and 8D illustrate an example of a transmission job list and a print job list displayed when the stop key is pressed during the display of the main menu screen in the image processing apparatus.
Figure 8D:
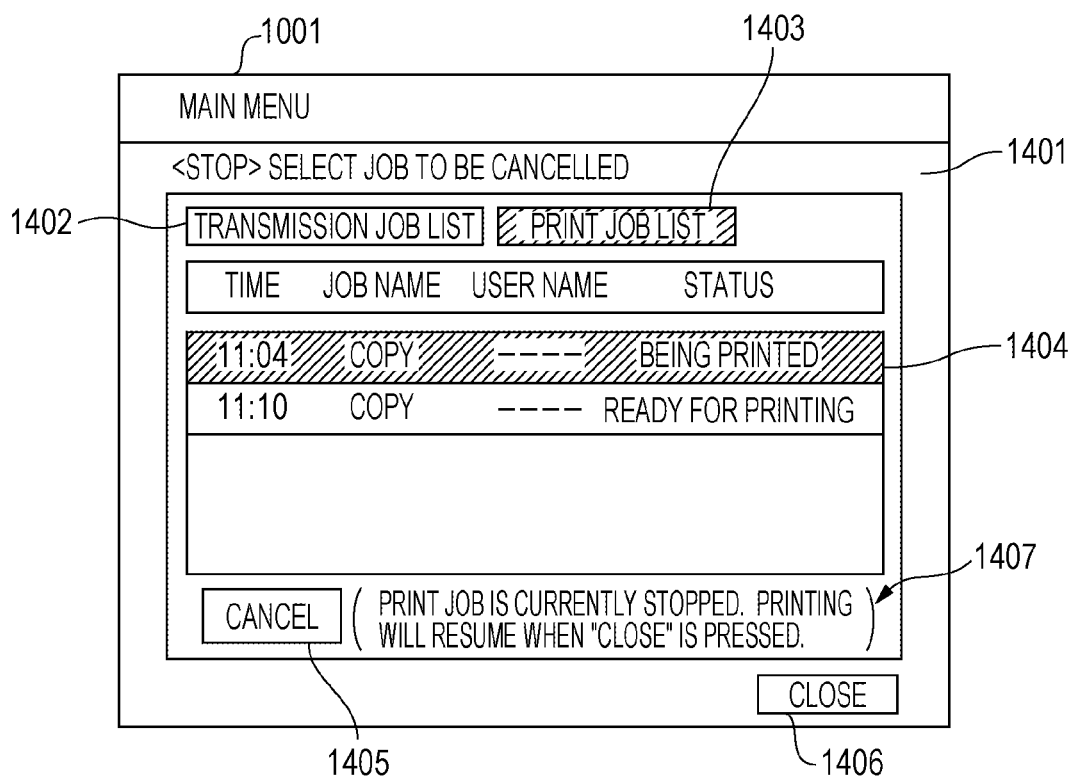

In a case where the transmission job exists in S2006 and it is determined in S2007 that the print job exists, a screen illustrated in FIG. 8C is displayed on the display 122. On the screen 1401 illustrated in FIG. 8C, the "transmission job list" button 1402 and the "print job list" button 1403 are set to be valid. In FIG. 8C, the "transmission job list" button 1402 is set in a pressed state, and the "print job list" button 1403 is set in a non-pressed state. A list of the transmission jobs corresponding to the cancellation targets is displayed in the job list area 1404. In a case where the user perform the tap operation on the "print job list" button 1403, a screen illustrated in FIG. 8D is displayed on the display 122. In FIG. 8D, the "transmission job list" button 1402 is set in the non-pressed state, and the "print job list" button 1403 is set in the pressed state. A list of the transmission jobs corresponding to the cancellation targets is displayed in the job list area 1404. A message is displayed in the area 1407 which notifies the user that the print job is suspended, and the printing is to be resumed when the tap operation on the close button 1406 is performed.

Figure 8E:
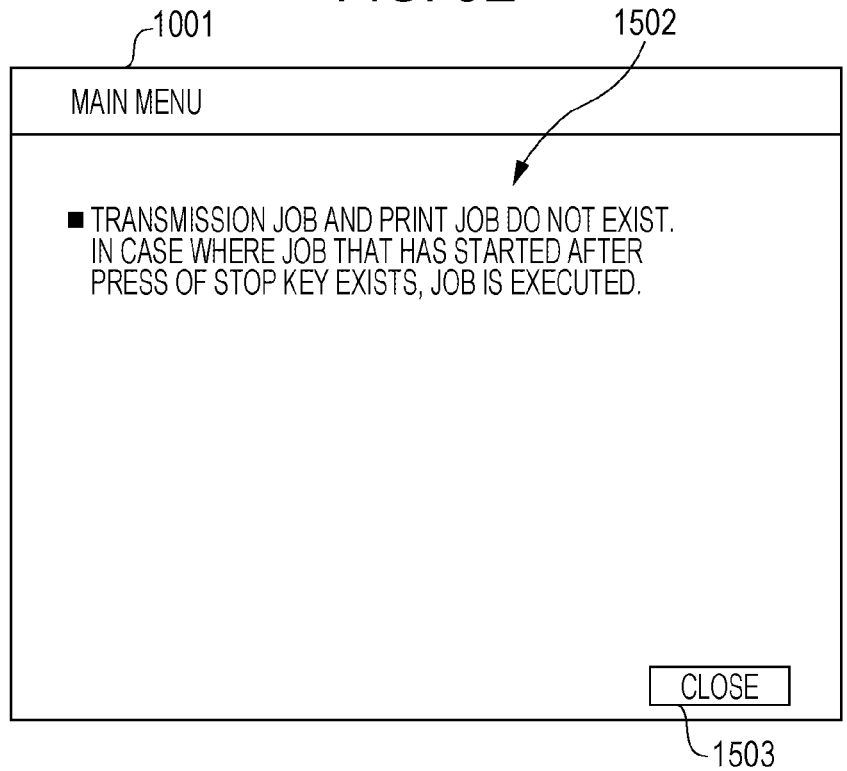
FIGS. 8E and 8F illustrate an example of a display screen in a case where no jobs to be cancelled exist when the stop key is pressed during the display of the main menu screen and a screen for confirming the cancellation of the job in the image processing apparatus.

In a case where it is determined in S2010 that the print job does not exist, the main menu app 411 displays a screen for notifying the user that the cancellation target job does not exist on the display 122 in S2012. A screen illustrated in FIG. 8E is an example of a screen for notifying the user that the cancellation target job does not exist. A message 1502 notifies the user that the transmission job and the print job which are set as the cancellation candidates do not exist. Furthermore, the message 1502 notifies the user that the job which starts after the user presses the stop key 306 is executed. For example, after the user presses the stop key 306, it is supposed that the execution instruction of the print job is transmitted from the PC 201 to the image processing apparatus 100. In this case, the print job transmitted from the PC 201 is executed. A close button 1503 is a button for ending the display of this screen and displaying the main menu screen on the display 122.

The main menu app 411 determines whether or not the tap operation on the close button 1503 is performed (S2103). In a case where the tap operation on the close button 1503 is not performed, the main menu app 411 continues performing the processing described in S2103. In a case where the tap operation on the close button 1503 is performed, the main menu app 411 ends display of a screen 1501 indicating no job (S2014). Thereafter, the main menu app 411 ends the display of the job cancellation screen displayed in S2001 and completes the processing described in this flow chart (S2105).

Next, the processing executed in S2009 of FIG. 7A will be described with reference to FIG. 7B. The program for executing the processing described in this flow chart is stored in the ROM 113 or the external memory 123, and the processing is realized when the above-described program developed into the RAM 112 is executed.

The main menu app 411 selects a type of the job corresponding to a an update target (S2101). The main menu app 411 refers to statuses of the "transmission job list" button 1402 and the "print job list" button 1403 and selects the type of the job set in the pressed state as the update target of the job list. That is, when the "transmission job list" button 1402 is in the pressed state, the transmission job is set as the update target, and when the "print job list" button 1403 is in the pressed state, the print job is set as the update target.

The main menu app 411 obtains a currently executed job list from the job processing unit 402 with regard to the job type selected in S2101 (S1202). Then, the main menu app 411 displays the obtained currently executed job list in the job list area 1404 (S2103). Next, the main menu app 411 updates a display status of the cancellation button 1405 (S1204). In a case where the job exists in the job list obtained in S2102, the main menu app 411 sets the cancellation button 1405 to be valid. When the cancellation button 1405 is set to be valid, the user can cancel the selected job by performing the tap operation on the cancellation button 1405. In a case where the job does not exist in the job list obtained in S2102, the main menu app 411 sets the cancellation button 1405 to be invalid. When the cancellation button 1405 is set to be invalid, the cancellation button 1405 is displayed in a graying-out manner, and the job cancellation is not performed even when the user performs the tap operation on the cancellation button 1405.

The main menu app 411 selects the job to be displayed in the selected state from the jobs included in the displayed job list (S2105). For example, when the update processing of the job list illustrated in FIG. 7B is started, it is supposed that the job is selected in the job list displayed in the job list area 1404. At this time, the main menu app 411 also selects the same job as the job selected in the job list before the update in the job list after the update. In a case where the job is not selected in the job list before the update, the main menu app 411 selects the job having the earliest time at which the job starting instruction is performed. In a case where the job is not included in the job list after the update, the processing described in S2105 is completed without selecting any of the jobs.

Next, processing after the completion of the processing in S2009 will be described with reference to FIG. 7C. The program for executing the processing described in this flow chart is stored in the ROM 113 or the external memory 123, and the processing is realized when the above-described program developed into the RAM 112 is executed.

Figure 8F:
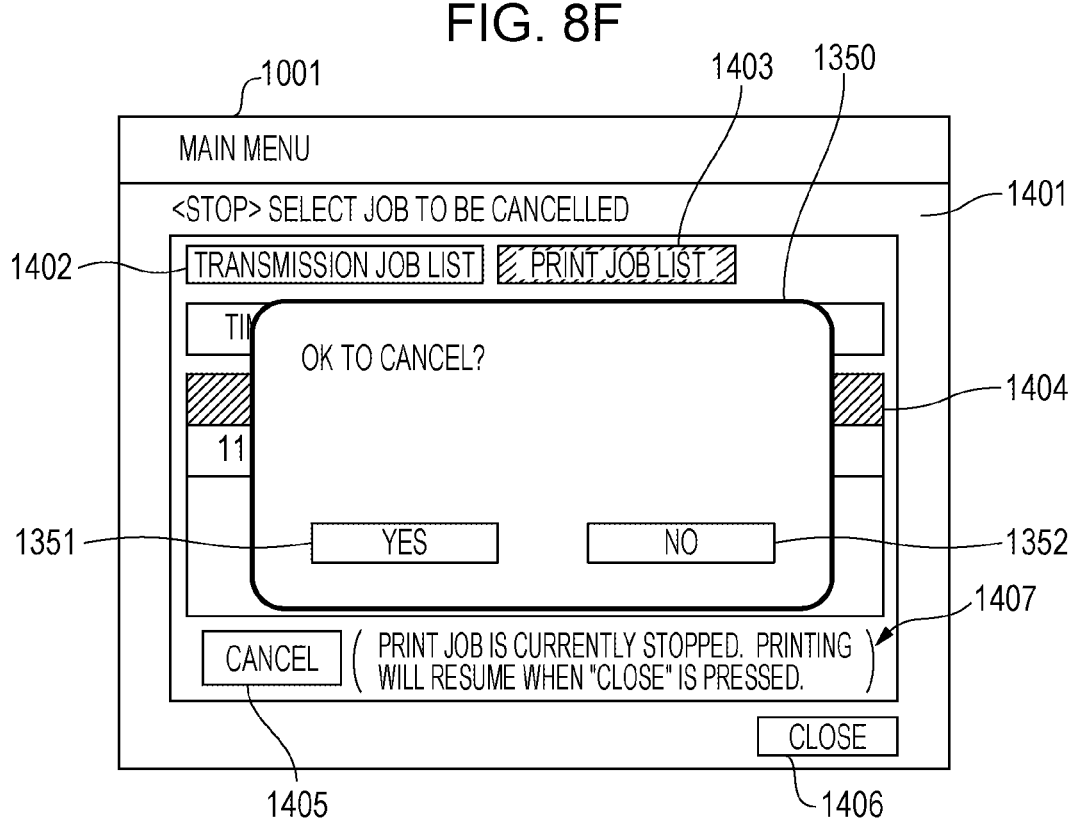

The main menu app 411 determines whether or not the tap operation on the cancellation button 1405 is detected (S2201). In a case where the tap operation on the cancellation button 1405 is detected, the main menu app 411 instructs the job processing unit 402 to cancel the selected job among the jobs displayed in the job list area 1404. The job processing unit 402 cancels the selected job in accordance with the instruction of the job cancellation received from the main menu app 411. The main menu app 411 displays a cancellation confirmation screen 1350 on the display 122 (S2203). FIG. 8F illustrates an example of the cancellation confirmation screen 1350. A "yes" button 1351 is a button for cancelling the selected job, and a "no" button 1352 is a button for returning to the job selection screen without cancelling the selected job. The main menu app 411 determines whether or not the tap operation on the "no" button 1352 is performed (S2204). In a case where the tap operation on the "no" button 1352 is performed, the main menu app 411 returns the processing to S2201. In a case where the tap operation on the "no" button 1352 is not performed, the main menu app 411 determines whether or not the tap operation on the "yes" button 1351 is performed (S2205). In a case where the tap operation on the "yes" button 1351 is not performed, the main menu app 411 returns the processing to S2204. In a case where the tap operation on the "yes" button 1351 is performed, the main menu app 411 executes the update of the job list described in S2009 and advances the flow to the processing in S2015 of FIG. 7A.

The main menu app 411 determines whether or not the tap operation on the "transmission job list" button 1402 or the "print job list" button 1403 is performed (S2206). In a case where the tap operation on the "transmission job list" button 1402 or the "print job list" button 1403 is performed, the main menu app 411 updates the selected job list button into the pressed state. Then, the main menu app 411 updates the job list button that has not been selected into the non-pressed state (S2207). Thereafter, the main menu app 411 executes the processing described in S2009.

The main menu app 411 determines whether or not the notification of the completion of the job is performed (S2008). For example, in a case where the execution of the job that is not to be suspended such as the FAX transmission is completed, the main menu app 411 receives the completion notification of the job from the job processing unit 402 and determines that the job is completed. In a case where the job is completed, the main menu app 411 executes the processing described in S2009.

In a case where the job is not completed, the main menu app 411 determines whether or not the job is selected (S2209). In a case where the job is selected, the main menu app 411 sets the job selected by the user in the selected state and displays the selected job (S2210). The main menu app 411 also sets the other job in the non-selected state to be displayed. Thereafter, the main menu app 411 executes the processing described in S2009.

The main menu app 411 determines whether or not the tap operation on the close button is performed (S2211). In a case where the tap operation on the close button is not performed, the main menu app 411 returns the processing to S2201. In a case where the tap operation on the close button is performed, the main menu app 411 determines whether or not all the print jobs are suspended (S2212). The main menu app 411 refers to the flag stored in the RAM 112 and determines whether or not all the print jobs are suspended. In a case where all the print jobs are not suspended, the main menu app 411 completes the processing described in FIG. 7C. In a case where all the print jobs are suspended, the main menu app 411 instructs the job processing unit 402 to cancel the suspension with respect to all the print jobs (S2213). The job processing unit 402 cancels the suspension of all the print jobs in accordance with the instruction from the main menu app 411. Thereafter, the main menu app 411 completes the processing described in FIG. 7C.

The processing executed in a case where the stop key is pressed on the main menu app screen has been described above. The image processing apparatus 100 displays the list of the transmission jobs in accordance with the press of the stop key during the display of the main screen as described above. With the above-described configuration, it is possible to display the screen in which the transmission job that is not to be suspended is more easily cancelled than the print job to be suspended on the basis of the press of the stop key during the display of the main screen.

Figure 9A:
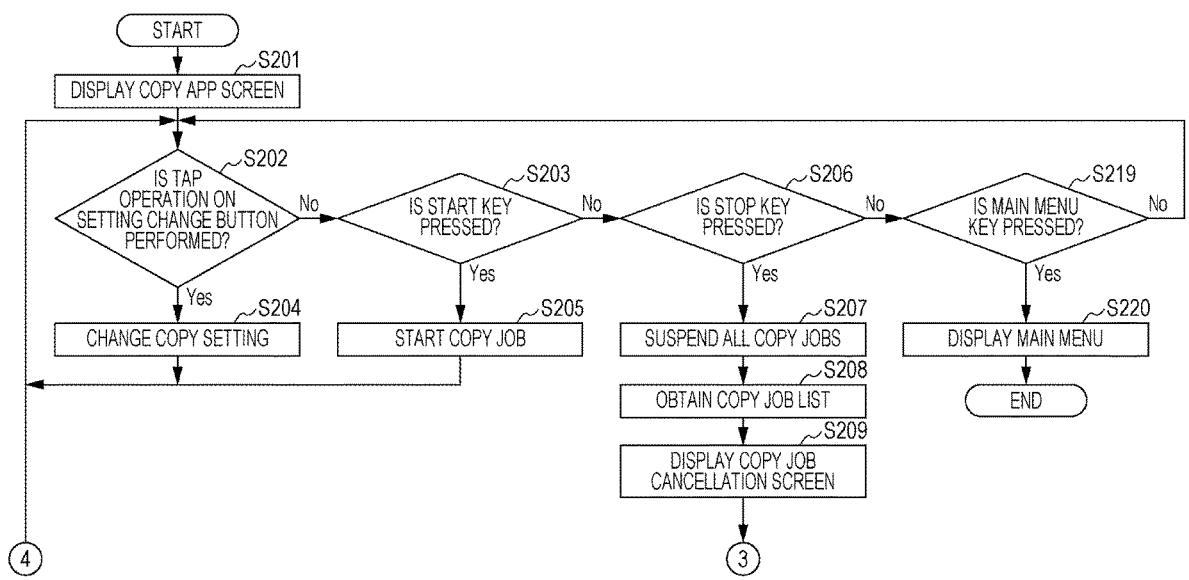
FIGS. 9A and 9B are flow charts illustrating processing executed by a copy application (app) in the image processing apparatus.
Figure 9B:
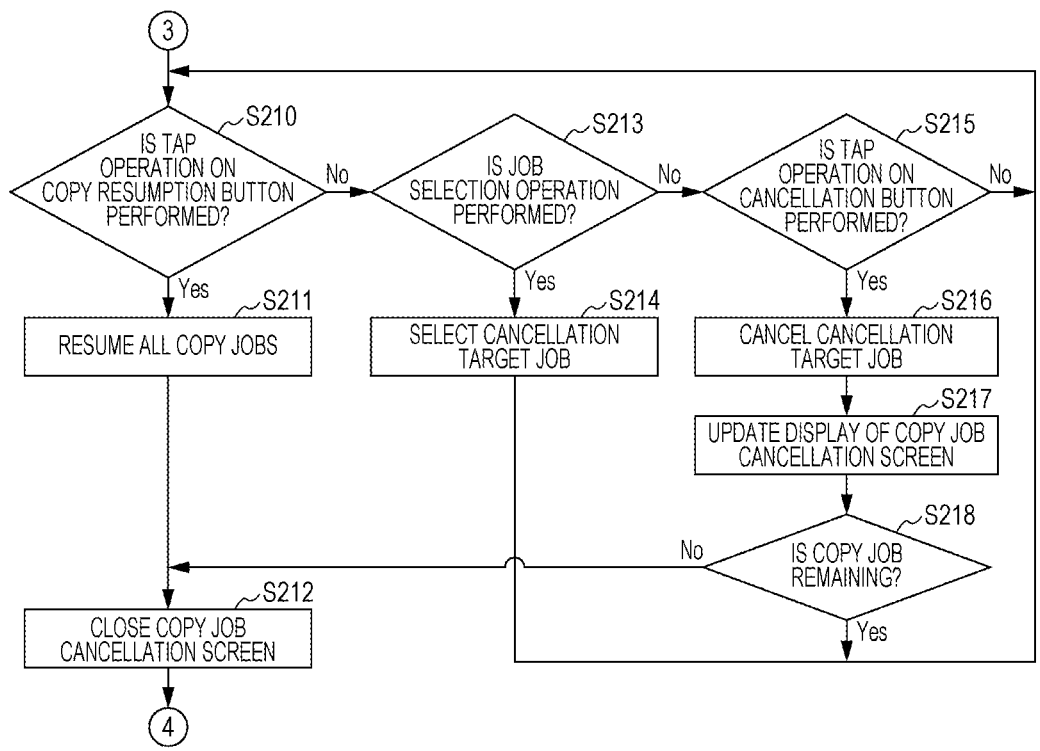

Next, an operation of the image processing apparatus 100 when copying is selected on the main menu screen will be described with reference to FIGS. 9A and 9B and FIGS. 10A and 10B. FIGS. 9A and 9B illustrate processing executed by the copy app 413 when the user performs the tap operation on the "copy" key 1002 in the main menu. The program for executing the processing described in this flow chart is stored in the ROM 113 or the external memory 123, and the processing is realized when the above-described program developed into the RAM 112 is executed.

Figure 10A:
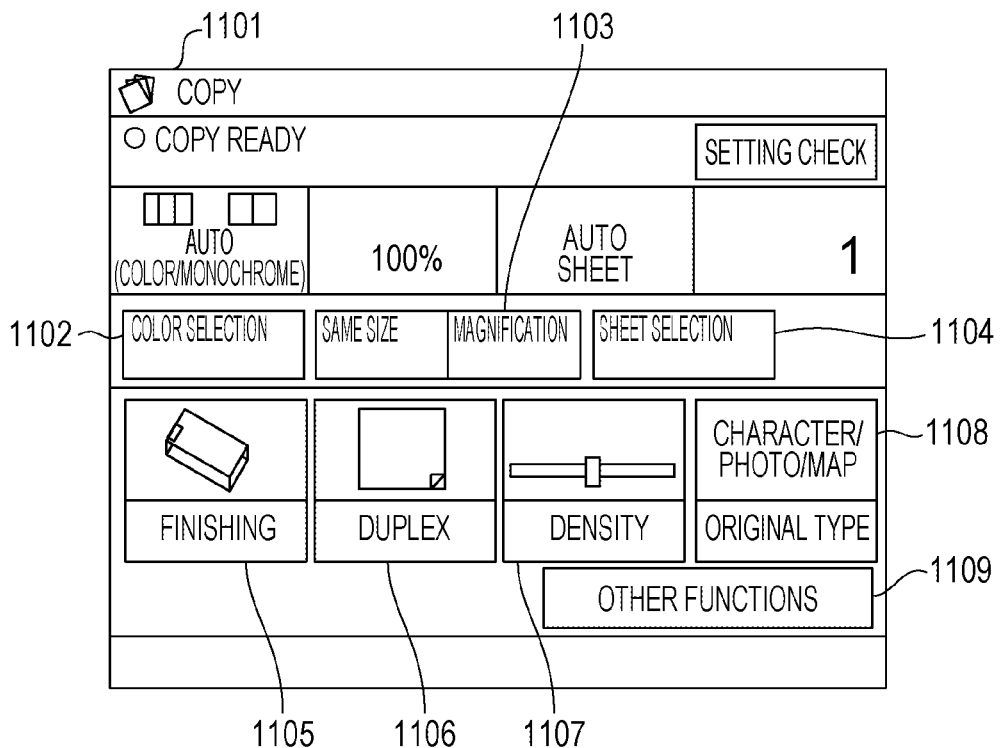
FIGS. 10A and 10B illustrate an example of a "copy" screen in the image processing apparatus.

The copy app 413 receives a notification from the main menu app 411 in S104 of FIG. 6 and displays a copy app screen on the display 122 (S201). FIG. 10A illustrates an example of a copy screen 1101 displayed on the display 122 in S201. Setting change buttons 1102 to 1109 for changing copy settings are arranged on the copy screen 1101. Among the setting change buttons 1102 to 1109, the color selection button 1102 is used for setting a color mode. The magnification button 1103 is used for setting a magnification. The sheet selection button 1104 is used for setting a sheet. The finishing button 1105 is used for setting finishing. The duplex button 1106 is used for setting duplex copying. The density button 1107 is used for setting a density. The original type button 1108 is used for setting a type of the original. The other function button 1109 is used for performing a setting other than the above-described settings.

Next, the copy app 413 determines whether or not the user performs the tap operation on the setting change buttons 1102 to 1109 for performing the setting change in the copying (S202). In a case where the tap operation on any one of the setting change buttons 1102 to 1109 is performed, the copy app 413 changes the copy setting in accordance with a key where the press has been detected in S202 described above (S204). For example, when the key where the tap operation has been detected in S202 is the color selection button 1102, the copy app 413 displays the screen for setting the color mode on the display 122 sets the color mode in accordance with the operation of the user. The same also applies to the case of the other setting change buttons 1103 to 1109. In a case where the numeric key 303 or the reset key 304 is pressed in S202, the processing described in S204 may be executed. In a case where it is determined in S202 that the numeric key 303 is pressed, the copy app 413 sets the number of copies in accordance with the pressed key. As an alternative to the above-described configuration, in a case where the reset key 304 is pressed, the copy app 413 may also discard the setting value that has been set thus far and set the initial value stored in the ROM 113. After the end of this step, the copy app 413 returns the processing to step S202.

In a case where the tap operation on the setting change buttons 1102 to 1109 is not performed, the copy app 413 determines whether or not the start key is pressed (S203). In a case where the start key is pressed, the copy app 413 instructs the job processing unit 402 to start the copy job on the basis of the set copy setting (S205). When the start of the copy job is instructed, the job processing unit 402 generates a new job and holds information thereof in the RAM 112. The job includes information indicating a "status" of this job. The information indicating the "status" included in the job takes a value such as "standby", "in execution", or "in suspension". The status of the copy job immediately after the generation is "standby". In a case where the printer 124 and the scanner 125 are not used for the other job and can be used, the job processing unit 402 changes the job status to "in execution" and performs reading of the original from the scanner 125 and printing from the printer 124. The operation of the job processing unit 402 is independent from the flow of the copy app illustrated in FIGS. 9A and 9B and is processed in parallel. That is, the copy app 413 returns the processing to step S202 without waiting for the execution end of the copy job generated in the S205.

In a case where the stop key is not pressed, the copy app 413 determines whether or not the stop key 306 is pressed (S206). In a case where the stop key is pressed, the copy app 413 instructs the job processing unit 402 to suspend all the copy jobs (S207). In response to the instruction of the suspension of all the copy jobs, the job processing unit 402 suspends all the copy jobs. That is, the job processing unit 402 sets the statuses of all the copy jobs generated in response to the copy starting instruction in step S205 as "in suspension". In a case where the copy job that is still being executed performs the reading from the scanner 125 and the output to the printer 124, the job processing unit 402 suspends the operations of the scanner 125 and the printer 124 when the process reaches a boundary of pages.

Next, the copy app 413 obtains a list of the copy jobs from the job processing unit 402 (S208). FIG. 11A illustrates an example of the obtained list of the copy jobs. In the example of FIG. 11A, the list of the copy jobs includes information of the two jobs. The information of the respective jobs is constituted by information including the job ID for uniquely identifying the job, the job accepted time, the number of pages, the number of copies, and the job status. The information included in the job list is not limited to the above-described information. For example, the settings of the respective copy jobs may be included in the copy job.

Figure 10B:
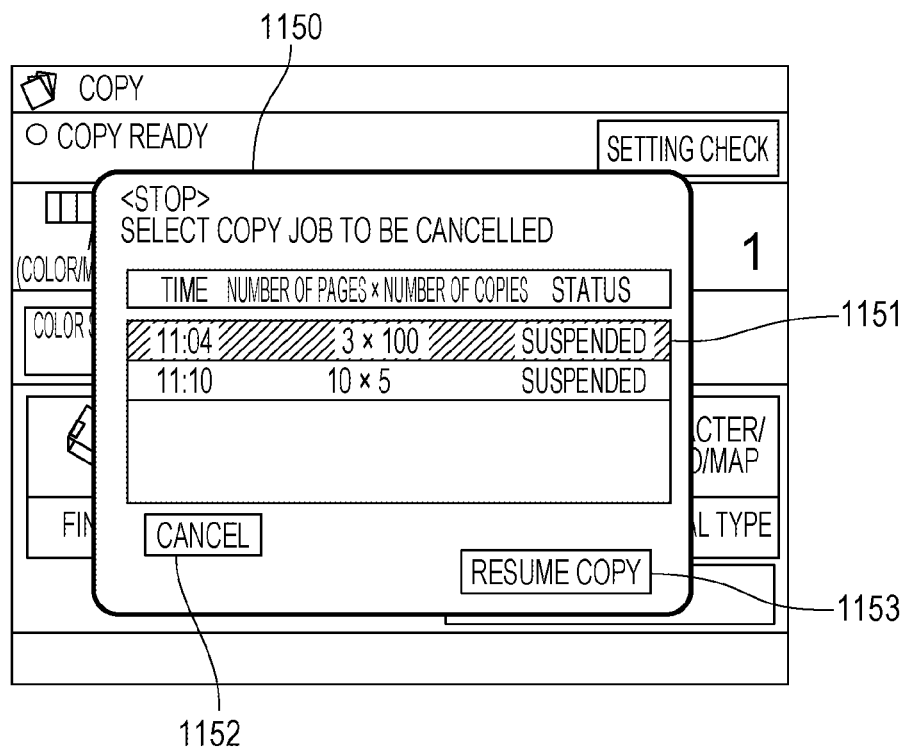

Next, the copy app 413 displays a copy job cancellation screen on the basis of the job list obtained in S207 (S209). FIG. 10B illustrates an example of the copy job cancellation screen. As illustrated in FIG. 10B, a copy job cancellation screen 1150 is displayed while being overlapped with the copy app screen. A copy job list 1151, a cancellation button 1152, and a "resume copy" button 1153 are arranged on the copy job cancellation screen 1150. The information of the respective jobs is displayed in the copy job list 1151 on the basis of the information of the job obtained in S207. According to the present exemplary embodiment, the job accepted time, the number of pages, the number of copies, and the job status are displayed as the information of the respective jobs. The user can select one of the displayed jobs in the copy job list 1151. In FIG. 10B, the selected job is represented by way of hatching. The initial job in the job list, that is, the job having the earliest job accepted time is selected on the copy job cancellation screen 1150 displayed in the first place after the stop key 306 is pressed. According to the present exemplary embodiment, only the copy job is obtained from the job processing unit 402 and displayed as a cancellation target. With the above-described configuration, since the job having a type other than copying is not displayed as the cancellation target, it becomes easier for the user to search for the job to be cancelled in a case where the copy job is desired to be cancelled.

Next, the copy app 413 accepts the user operation and determines whether or not the accepted user operation is the tap operation on the "resume copy" button 1153 (S210). In a case where the tap operation on the "resume copy" button 1153 is performed, the copy app 413 instructs the job processing unit 402 to resume the copy job suspended in S206 (S211). The job processing unit 402 sets the job status as "in execution" or "standby" in accordance with the instruction from the copy app 413. Thereafter, the copy app 413 ends the display on the copy job cancellation screen 1150 and returns the processing to S202 (S212).

In a case where the tap operation on the "resume copy" button 1153 is not performed, the copy app 413 determines whether or not the job is selected on the basis of the press of the item (job) displayed in the copy job list 1151 (S213). In a case where the job is selected, the copy app 413 displays the selected job by way of hatching to be put into the selected state. The copy app 413 also ends the hatching display of the item that has not been selected and cancels the selected state. After this step, the copy app 413 returns the processing to S209.

In a case where the job selection operation is not performed, the copy app 413 determines whether or not the press of the cancellation button 1152 is detected (S215). In a case where the cancellation button 1152 is not pressed, the copy app 413 returns the processing to S210.

In a case where the cancellation button 1152 is pressed, the copy app 413 cancels the job corresponding to the selected item among the jobs displayed in the copy job list 1151 (S216). Specifically, the job processing unit 402 is instructed to specify the job ID of the selected job to cancel. The job processing unit 402 cancels the copy job having the job ID instructed from the copy app 413.

Next, the copy app 413 updates the display on the copy job cancellation screen 1150 (SS217). The copy app 413 obtains the status of the copy job from the job processing unit 402 and updates the job list displayed on the display 122.

Next, the copy app 413 determines whether or not the copy job is remaining in the job list as a result of the update in S215 (S218). When the copy job is remaining, the copy app 413 returns the processing to S209. When the copy job is not remaining, the copy app 413 shifts the processing to S212.

Next, in a case where the stop key is not pressed, the copy app 413 calls out the main menu app 411. The main menu app 411 displays the main menu screen in accordance with the instruction from the copy app 413.

In a case where the stop key 306 is pressed on the copy screen 1101 from S207 of FIG. 9A, the job processing unit 402 stops only the copy job. Therefore, the print job for printing the image data received from the PC is not suspended. For this reason, in a case where the stop key 306 is pressed on the copy screen 1101 so that the user attempts to cancel the copy job, it is possible to avoid a situation where the print job that is not to be cancelled is suspended.

In the processing described in FIGS. 9A and 9B, the press of the status check/cancellation key 302 may be detected during the display of the copy screen 1101, and the "status check/cancellation" screen 1301 may be displayed on the display 122. With the above-described configuration, the user presses the status check/cancellation key 302 during the display of the copy screen 1101 and displays the "status check/cancellation" screen 1301 on the display 122 so that the job other than the copy job can be cancelled.

Figure 12A:
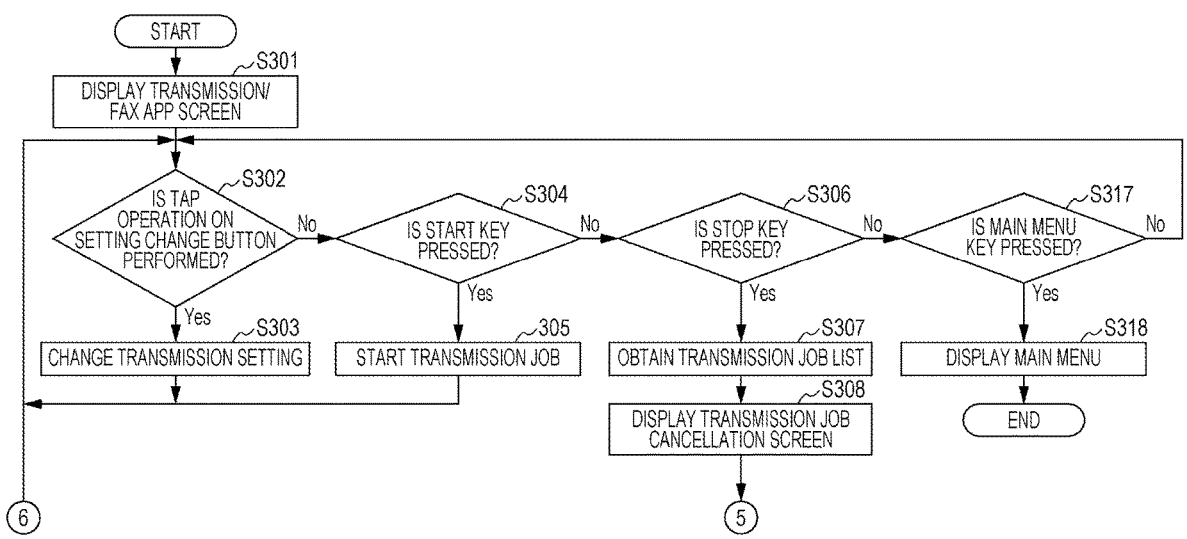
FIGS. 12A and 12B are flow charts illustrating processing executed by a transmission/FAX app in the image processing apparatus.
Figure 12B:
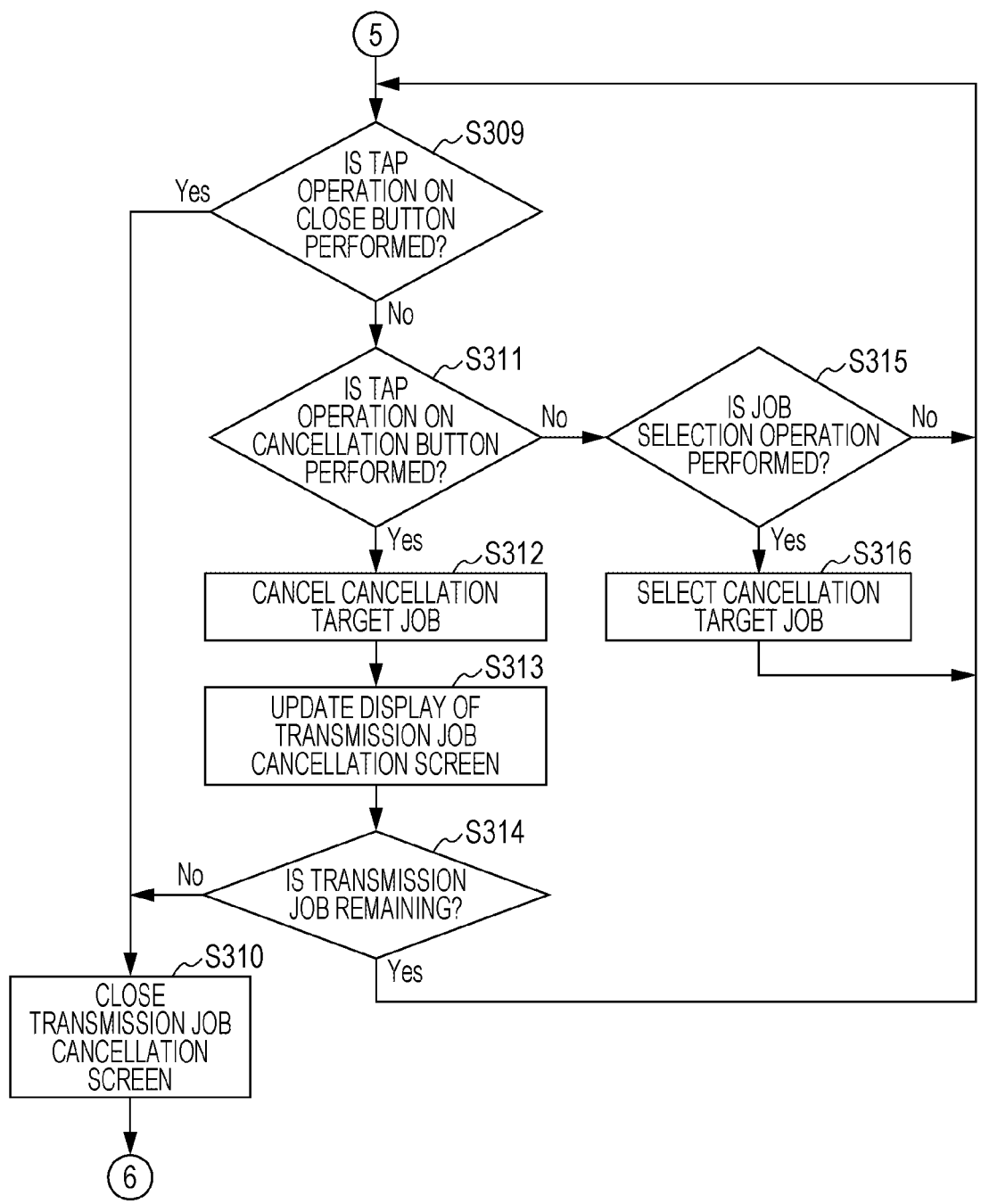

Next, an operation of the image processing apparatus 100 when the "scan and send" key 1003 is selected on the main menu screen will be described with reference to FIGS. 12A and 12B and FIGS. 13A and 13B. FIGS. 12A and 12B illustrate processing executed by the transmission/FAX app 414 when the user performs the tap operation on the "scan and send" key 1003 on the main menu. The program for executing the processing described in this flow chart is stored in the ROM 113 or the external memory 123, and the processing is realized when the above-described program developed into the RAM 112 is executed.

Figure 13A:
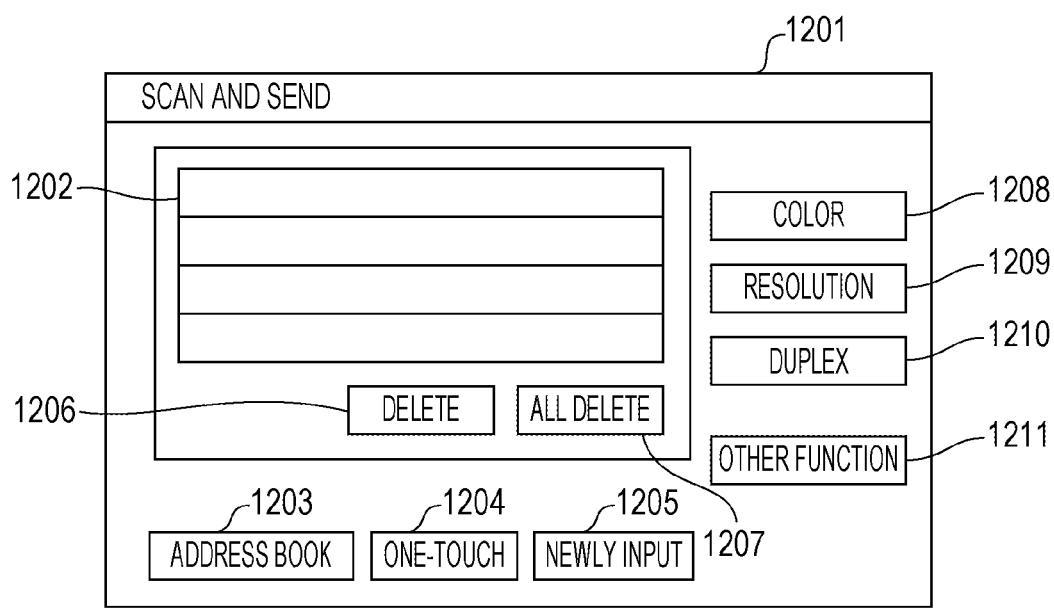
FIGS. 13A and 13B illustrate an example of a "scan and transmit" screen in the image processing apparatus.

The transmission/FAX app 414 receives the notification from the main menu app 411 in S105 of FIG. 6 and displays the transmission/FAX app screen on the display 122 (S301). FIG. 13A illustrates an example of a "scan and send" screen 1201 displayed on the display 122 in S301.

As illustrated in FIG. 13A, buttons 1203 to 1207 for setting a transmission/FAX destination are arranged on the "scan and send" screen 1201. Among the buttons 1203 to 1207, the address book button 1203 is used for calling out an address book such that the user can select the destination from the address book. The one-touch button 1204 is used such that the user can select the destination from a list of destinations registered as a one-touch destination. The new address input button 1205 is used such that the user can newly input a destination such as a FAX telephone number or a mail address. The transmission/FAX destination input by the user using the address book button 1203, the one-touch button 1204, and the new address input button 1205 is displayed in the transmission destination list 1202. When the user presses the deletion button 1206, the selected destination among the destinations displayed in the transmission destination list 1202 is deleted. When the user presses an all delete button 1207, all the destinations displayed in the transmission destination list 1202 are deleted.

Setting change buttons 1208 to 1211 for changing the transmission setting of the transmission/FAX are arranged on the "scan and send" screen 1201. Among the buttons 1208 to 1211, the color selection button 1208 is used for setting a color mode. The resolution selection button 1209 is used for setting a resolution. The duplex button 1210 is used for setting a duplex or double-sided original. The other function button 1211 is used for performing a setting other than the above-described settings.

Next, the transmission/FAX app 414 determines whether or not the user performs the tap operation on the destination setting buttons 1203 to 1207 for the copy setting change or the transmission setting change buttons 1208 to 1211 (S302). In a case where the tap operation on the destination setting buttons 1203 to 1207 or the transmission setting change buttons 1208 to 1211 is performed, the transmission/FAX app 414 performs the setting of the transmission destination or the change of the transmission setting in accordance with the button where the tap operation is performed (S303). For example, when the button where the tap operation is performed in S302 is the address book button 1203, the transmission/FAX app 414 opens an address book screen (not illustrated) and accepts the destination selection from the address book. When the button where the tap operation is performed in S302 is the color selection button 1208, the screen for setting the color mode is displayed in the display 122, and the color mode is set in accordance with the operation of the user. The same also applies to the case where the tap operation on the other destination setting buttons 1203 to 1207 and the setting change buttons 1208 to 1211 is performed. In a case where the numeric key 303 or the reset key 304 is pressed, the transmission/FAX app 414 may also execute the processing in S304. For example, in a case where the numeric key 303 is pressed, the transmission/FAX app 414 sets a FAX number at the transmission destination in accordance with the pressed key. As an alternative to the above-described configuration, in a case where the reset key 304 is pressed, the transmission/FAX app 414 discards the destination and the setting value which have been set thus far and sets the initial value stored in the ROM 113. After the end of this step, the processing returns to step S302.

Next, in a case where the tap operation on the setting change button is not performed, the transmission/FAX app 414 determines whether or not the start key is pressed (S304). In a case where the start key is pressed, the transmission/FAX app 414 instructs the job processing unit 402 to start the transmission job on the basis of the set transmission destination and the transmission setting (S305). When the start of the transmission job is instructed, the job processing unit 402 generates a new job and holds information thereof in the RAM 112. The transmission job includes information indicating a "status" of the job. The "status" of the transmission job includes "standby", "being scanned", and "being transmitted". The status of the transmission job immediately after the generation is "standby". In a case where the scanner 125 can be used since the scanner is not used for the other job, the job processing unit 402 changes the job status to "being scanned" and reads the original from the scanner 125. In a case where the image read from the scanner 125 exists and the transmission by the communication processing unit 401 can be performed, the job processing unit 402 changes the job status into "being transmitted" and transmits the image through the communication processing unit 401. The operation of the job processing unit 402 is independent from the flow of the transmission/FAX app illustrated in FIGS. 12A and 12B and is processed in parallel. That is, the transmission/FAX app 414 returns the processing to S302 without waiting for the end of the transmission job generated in S305.

In a case where the stop key is not pressed, the transmission/FAX app 414 determines whether or not the stop key 306 is pressed (S306). In a case where the stop key 306 is pressed, the transmission/FAX app 414 determines whether or not the scanner 125 currently operates. In a case where the scanner 125 currently operates, the transmission/FAX app 414 suspends the operation of the scanner. Then, the transmission/FAX app 414 obtains the list of the transmission jobs from the job processing unit 402 (S307). FIG. 11B illustrates an example of the list of the transmission jobs obtained from the transmission/FAX app 414. In the example of FIG. 11B, the list of the transmission jobs includes information of two jobs. The information of the respective jobs is constituted by the ID for uniquely identifying the job, the job accepted time, the destination, and the information about the job status. As will be different from the case of copying, the transmission job is not to be suspended. For this reason, the respective jobs in the job list obtained in this step are not also in the suspended state. The information included in the job list is not limited to the information described in FIG. 11B. For example, a setting value (such as the color mode or resolution) of the job may be included in the job list.

Figure 13B:
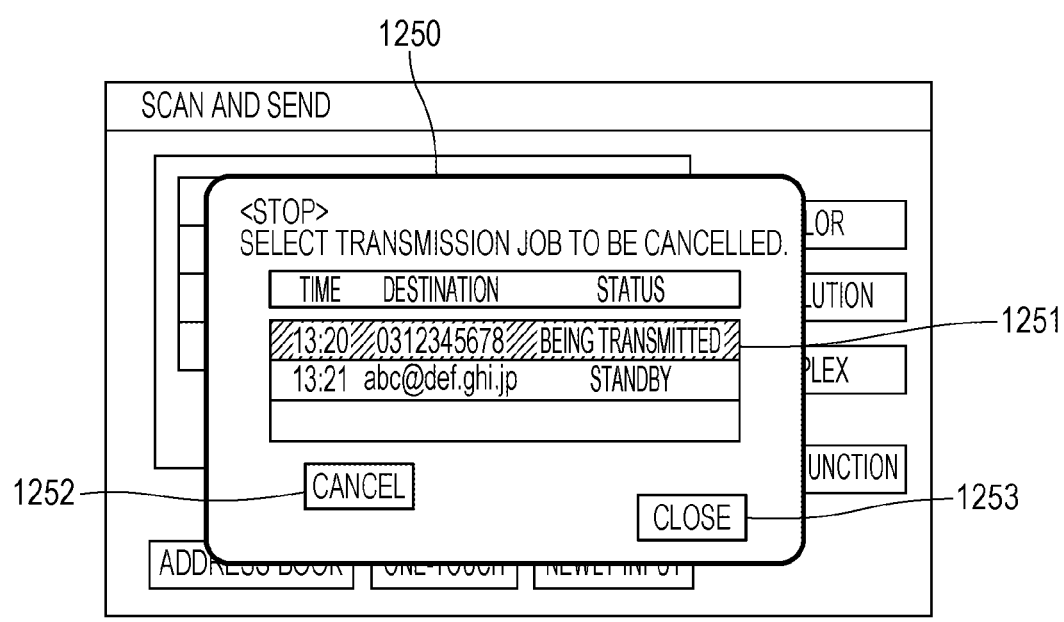
Figure 14B:
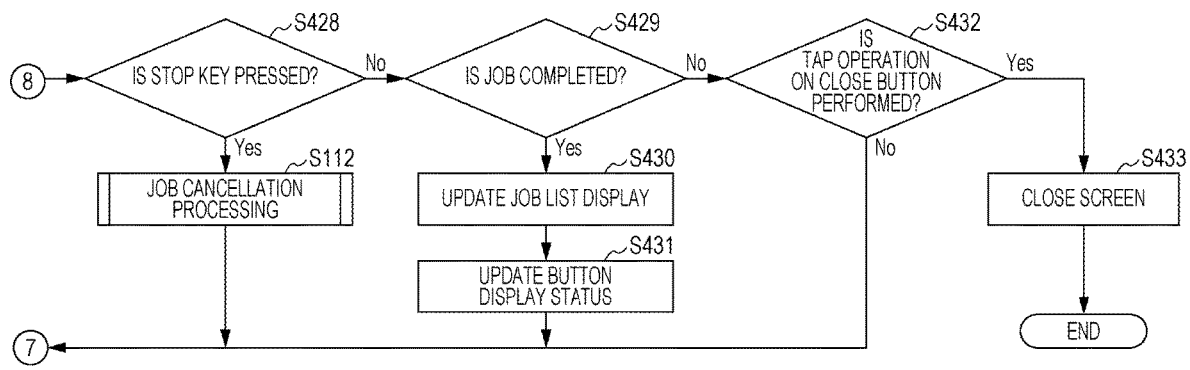
FIG. 14B is a flow chart illustrating processing subsequently executed by the status check/cancel app after the processing illustrated in FIG. 14A1 and FIG. 14A2 in the image processing apparatus.

Next, the transmission/FAX app 414 displays a transmission job cancellation screen on the basis of the job list obtained in S306 (S308). FIG. 13B illustrates an example of the transmission job cancellation screen. As illustrated in FIG. 13B, a transmission job cancellation screen 1250 is displayed while being overlapped with the "scan and send" screen 1201. A transmission job list 1251, a "cancellation" button 1252, and a "close" button 1253 are arranged on the transmission job cancellation screen 1250. Pieces of the information of the respective jobs are displayed in the transmission job list 1251 on the basis of the job information obtained in step S306 described above. According to the present exemplary embodiment, the job accepted time, the destination, and the job status are displayed as the information of the respective jobs. One of the displayed jobs can be selected in the transmission job list 1251. In FIG. 13B, the selected job is represented by way of hatching. In an initial state immediately after the transmission job cancellation screen 1250 is displayed, the initial item in the job list is set in the selected state. That is, the job having the earliest time when the job execution starting instruction has been performed is set in the selected state. As described in S307 and S308, in a case where the stop key 306 is pressed during the reading of the original, the transmission/FAX app 414 suspends the original reading operation by the scanner 125. Then, a screen for displaying a list of the transmission jobs is displayed. After the user closes the screen for selecting the cancellation job, the transmission/FAX app 414 resumes the original reading and executes the transmission job. With the above-described configuration, the user presses the stop key, and it is possible to immediately select the transmission job to be cancelled.

Next, the transmission/FAX app 414 accepts the operation of the user and determines whether or not the accepted operation is the tap operation on the "close" button 1253 (S309). In a case where the tap operation on the close button is detected, the transmission/FAX app 414 ends the display of the transmission job cancellation screen 1250. Thereafter, the transmission/FAX app 414 returns the processing to step S302 described above.

In a case where the tap operation on the close button is not performed, the transmission/FAX app 414 determines whether or not the tap operation on the "cancellation" button 1252 is performed (S311). The transmission/FAX app 414 instructs the job processing unit 402 to cancel the job corresponding to the selected item among the job displayed in the transmission job list 1251 (S312). The job processing unit 402 cancels the job having the job ID instructed from the transmission/FAX app 414.

Next, the transmission/FAX app 414 updates the display of the transmission job cancellation screen 1250 (S313). Specifically, the transmission/FAX app 414 obtains the status of the transmission job from the job processing unit 402 to be reflected on the display.

Next, the transmission/FAX app 414 determines whether or not the transmission job is remaining in the job list as a result of the update in S313 (S314). When the transmission job is remaining in the job list, the transmission/FAX app 414 returns the processing to step S308. When the transmission job is not remaining in the job list, the transmission/FAX app 414 shifts the processing to step S310.

In a case where the tap operation on the cancellation button is not detected, the transmission/FAX app 414 determines whether or not the job displayed in the transmission job list 1251 is selected (S315). The transmission/FAX app 414 displays the selected job in the transmission job list 1251 by way of hatching to be set in the selected state (S316). The transmission/FAX app 414 also cancels the hatching display of the item that has not been selected to cancel the selected state. After this step, the transmission/FAX app 414 returns the processing to step S309 described above.

In a case where the stop key 306 is not pressed, the transmission/FAX app 414 determines whether or not the main menu key 301 is pressed (S317). In a case where the main menu key 301 is not pressed, the transmission/FAX app 414 returns the processing to S302. In a case where the main menu key 301 is pressed, the transmission/FAX app 414 calls out the main menu app 411 (S318). The main menu app 411 displays the "main menu" screen 1001 on the display 122 in accordance with the instruction from the transmission/FAX app 414. Then, the transmission/FAX app 414 ends the processing described in this flow chart.

When the above-described processing is executed, the image processing apparatus 100 displays only the transmission job as the job set as the cancellation target when the stop key 306 is pressed during the display of the "scan and send" screen 1201. With the above-described configuration, the user can promptly select the job cancelled from the transmission jobs.

In FIGS. 12A and 12B, in a case where the status check/cancellation key 302 is pressed on the "scan and send" screen 1201, the "status check/cancellation" screen 1301 may be displayed. With the above-described configuration, it is possible to display the screen where the status of the job having the other job type can be immediately checked from the "scan and send" screen 1201. The user operates a "cancel" button 1307 on the "status check/cancellation" screen 1301 or the stop key 306 on the "status check/cancellation" screen 1301 so that it is possible to cancel the job other than the transmission job.

In S108 in the flow chart of FIG. 6, the box app 415 displays the setting screen on the display 122 and shifts the processing to the box app 415. Since the operation at the time of the press of the stop key in the box app 415 is similar to the copying, a description thereof will be omitted.

Next, the operation of the image processing apparatus 100 when the user presses the status check/cancellation key on the main menu screen will be described with reference to FIG. 14A1, FIG. 14A2, FIG. 14B, FIG. 15A, and FIG. 15B. FIG. 14A1, FIG. 14A2, and FIG. 14B illustrate processing executed by the status check/cancellation app 412 when the user presses the status check/cancellation key in the main menu. The program for executing the processing described in this flow chart is stored in the ROM 113 or the external memory 123, and the processing is realized when the above-described program developed into the RAM 112 is executed.

Figure 15A:
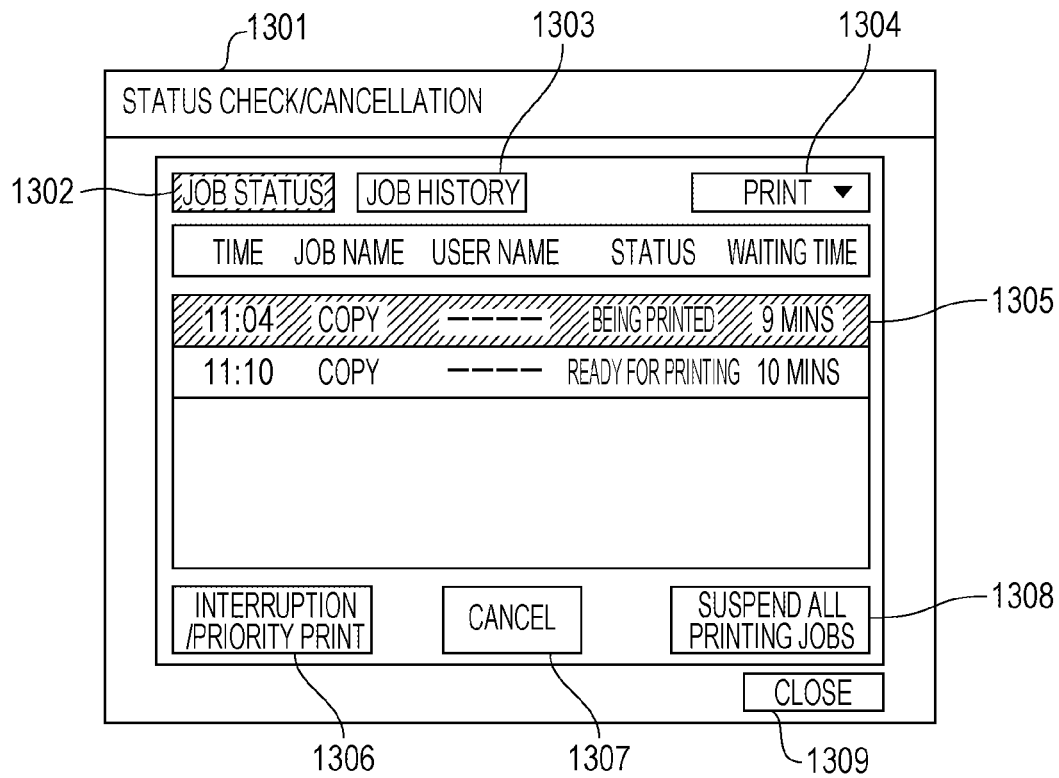
FIGS. 15A and 15B illustrate an example of a "status check/cancel" screen in the image processing apparatus.

The status check/cancellation app 412 receives the notification from the main menu app 411 in S110 of FIG. 6 and displays the "status check/cancellation" screen on the display 122 (S401). FIG. 15A illustrates an example of the "status check/cancellation" screen 1201 displayed on the display 122 in S401. As illustrated in FIG. 15A, the following graphical user interface (GUI) parts are arranged on the "status check/cancellation" screen 1301. A "job status" button 1302 is a button for setting contents to be displayed in a job list 1305 in the currently executed job list. A "job history" button 1303 is a button for setting the contents to be displayed in the job list 1305 in an ended job list (execution history of the jobs). The "job status" button 1302 and the "job history" button 1303 act exclusively. FIG. 15A illustrates a state in which the "job status" button 1302 is pressed by way of hatching. At this time, the currently executed job status is displayed in the job list 1305. That is, the execution history of the jobs is not displayed on the display 122.

A job type selection button 1304 is a button for selecting a job type of the job to be displayed in the job list 1305. The job type selection button 1304 is so-called a drop-down list or a pull-down list. When the job type selection button 1304 is pressed, a list of job types is displayed. When a selection is made from the displayed list, the user can select the job type to be displayed in the job list 1305. The job types displayed in the list when the job type selection button 1304 is pressed include "print", "copy", "transmission", "FAX transmission", "reception", and "saving". In the example of FIG. 15A, "print" is selected. FIG. 16 illustrates a correspondence relationship between the respective items of the job type selection buttons and the job type displayed in the job list 1305 when the item is selected.

Among the job types illustrated in the respective columns of FIG. 16, "copy" is a job that is input from the copy app 413 for printing the image read by the scanner 125 by using the printer 124. "Print" is a job for printing the image received from the PC 201 or the like via the network 203 by using the printer 124. "FAX transmission" is a job that is input from the transmission/FAX app 414 for transmitting the image read by the scanner 125 to the FAX 204. "FAX reception" is a job for printing the image received from the FAX 204 by using the printer 124. "E-mail transmission" is a job that is input from the transmission/FAX app 414 for transmitting the image read by the scanner 125 via the network 203 to the PC 201 or the like by way of E-mail. "Box saving" is a job for saving the image input from the box app 415 and read by the scanner 125 in the external memory 123 or the NAS 202. "Box print" is a job for printing the image input from the box app 415 and saved in the external memory 123 or the NAS 202 by the printer 124. "Report print" is a job for printing the apparatus status of the image processing apparatus 100 or the respective job execution statuses by using the printer 124. For example, in a case where "print" is selected on the job type selection button 1304, a list of the jobs "copy", "print", "FAX reception", "box print", and "report print" where the row of "print" in the table illustrated in FIG. 16 is selected is displayed.

A list of the statuses of the currently executed jobs and the execution histories of the ended jobs is displayed in the job list 1305 in accordance with the pressed states of the "job status" button 1302 and the "job history" button 1303 and the selected state of the job type selection button 1304. The information for the display is obtained from the job processing unit 402. Each of the rows in the list indicates a single job. The display contents of the respective rows in the list vary depending on whether the job execution status is displayed or the job execution history is displayed. Furthermore, the display contents also vary depending on the job type selected by the job type selection button 1304. In the example of FIG. 15A, the job status of the print job is displayed, and a time, a job name, a name of the user who inputs the job, a job status, and a waiting time are displayed in the respective rows in the job list 1305. The respective rows in the job list 1305 can be selected. When the user presses one row in the list, the pressed row is put into the selected state. The selected states in the respective rows are exclusive to each other. When the user selects one row, the selected state of the other row is cancelled.

An "interruption/priority print" button 1306 is a button for setting a priority of the job in the selected state in the job list 1305. The "cancel" button 1307 is a button for cancelling the job in the selected state in the job list 1305. A "suspend all print jobs" button 1308 is a button for suspending all the print jobs. A "close" button 1309 is a button for closing the "status check/cancellation" screen 1301.

Next, the status check/cancellation app 412 determines whether or not the tap operation on the "job status" button 1302 is performed (S402). In a case where the tap operation on the "job status" button 1302 is performed, the status check/cancellation app 412 obtains the currently executed job list of the job type selected by the job type selection button 1304 from the job processing unit 402 (S403). FIG. 11C illustrates an example of the currently executed job list obtained by the status check/cancellation app 412. FIG. 11C illustrates the example in a case where the job type is the print job. In the example of FIG. 11C, the print job list includes information of three jobs. The information of the respective jobs is constituted by information including the ID for uniquely identifying the job, the job name, the job accepted time, the user name who has input the job, the number of pages, the number of copies, the job status, and an estimated waiting time until the job ends. According to the present exemplary embodiment, the copy job is also treated as one type of the print job. In the case of the copy job, the job name is set as "copy". On the other hand, in a case where the print job is input from the PC 201 or the like via the network, a job name (typically, a file name) assigned to the job is used.

Next, the status check/cancellation app 412 reflects the contents of the currently executed job list obtained in S404 onto the display of the job list 1305 and displays the job list (S404).

Then, the status check/cancellation app 412 updates the display statuses of the buttons 1306 to 1308 (S405). In a case where the job type selected by the job type selection button is the print job or the copy job, the status check/cancellation app 412 displays the "interruption/priority print" button 1306 and the button 1308. In a case where the job type selected by the job type selection button is not the print job or the copy job, the status check/cancellation app 412 sets the "interruption/priority print" button 1306 and the button 1308 in a non-display state. Furthermore, when the currently executed job list obtained in S404 includes at least one job, the status check/cancellation app 412 sets the "interruption/priority print" button 1306 and the "cancel" button 1307 in a state in which the button can be pressed. When the currently executed job list obtained in S404 does not include a job, the status check/cancellation app 412 sets the "interruption/priority print" button 1306 and the "cancel" button 1307 in a state in which the press is not permitted. The state in which the press is not permitted refers, for example, to a state in which graying-out display is performed, and even when the user performs the tap operation on the "interruption/priority print" button 1306 and the "cancel" button 1307, the processing is not executed. The status check/cancellation app 412 determines whether or not all the print jobs are currently suspended in the job processing unit 402. In a case where all the print jobs are suspended, the status check/cancellation app 412 sets a button notation of the "suspend all print jobs" button 1308 as "resume all print jobs". In a case where all the print jobs are not suspended, the status check/cancellation app 412 sets the button notation of the "suspend all print jobs" button 1308 as "suspend all print jobs". After S405, the status check/cancellation app 412 returns the processing to step S402 described above.

In a case where the tap operation on the "job status" button 1302 is not performed, the status check/cancellation app 412 determines whether or not the tap operation on the "job history" button 1303 is performed (S406). In a case where the tap operation on the "job history" button 1303 is performed, the status check/cancellation app 412 obtains a job history list of the job type selected by the job type selection button 1304 from the job processing unit 402 (S407).

Next, the status check/cancellation app 412 reflects the contents of the job history list obtained in S407 onto the display of the job list 1305 (S408). Then, the status check/cancellation app 412 puts the "interruption/priority print"

button 1306, the "cancel" button 1307, and the "suspend all print jobs" button 1308 into a non-display state (S409). After S406, the status check/cancellation app 412 returns the processing to S402.

In a case where the job history is not selected, the status check/cancellation app 412 determines whether or not the job type to be displayed is selected by the job type selection button 1304 (S410). In a case where the job type is selected, the status check/cancellation app 412 obtains the currently executed job list corresponding to the selected job type or the job history list from the job processing unit 402 (S411). Then, the status check/cancellation app 412 displays the obtained job list in the job list 1305 (S412). Then, the status check/cancellation app 412 executes the processing similar to S405 or S409 in accordance with the selected button among the "job status" button 1302 and the "job history" button 1303 (S413). Thereafter, the status check/cancellation app 412 returns the processing to S402.

In a case where the tap operation on the job type selection button is not performed, the status check/cancellation app 412 determines whether or not the user selects the job (S414). In a case where the job is selected, the status check/cancellation app 412 performs the hatching display of the row where the press by the user is detected among the items (rows) displayed in the job list 1305 to be put into the selected state (S415). The status check/cancellation app 412 puts the other item (row) into the non-selected state without performing the hatching display. After step S413, the status check/cancellation app 412 returns the processing to step S402 described above.

In a case where the job is not selected, the status check/cancellation app 412 determines whether or not the tap operation on the "interruption/priority print" button 1306 is performed (S416). In a case where the tap operation on the "interruption/priority print" button 1306 is performed, the status check/cancellation app 412 instructs the job processing unit 402 to change the priority of the selected job in the job list (S417). With this configuration, the job processing unit 402 causes the selected job to be executed ahead of the other job or to interrupt the currently executed other job to be executed on the basis of the instruction of the status check/cancellation app 412. A detail of the processing in S417 will be omitted. After the processing described in S417 is executed, the status check/cancellation app 412 returns the processing to S402.

Figure 15B:
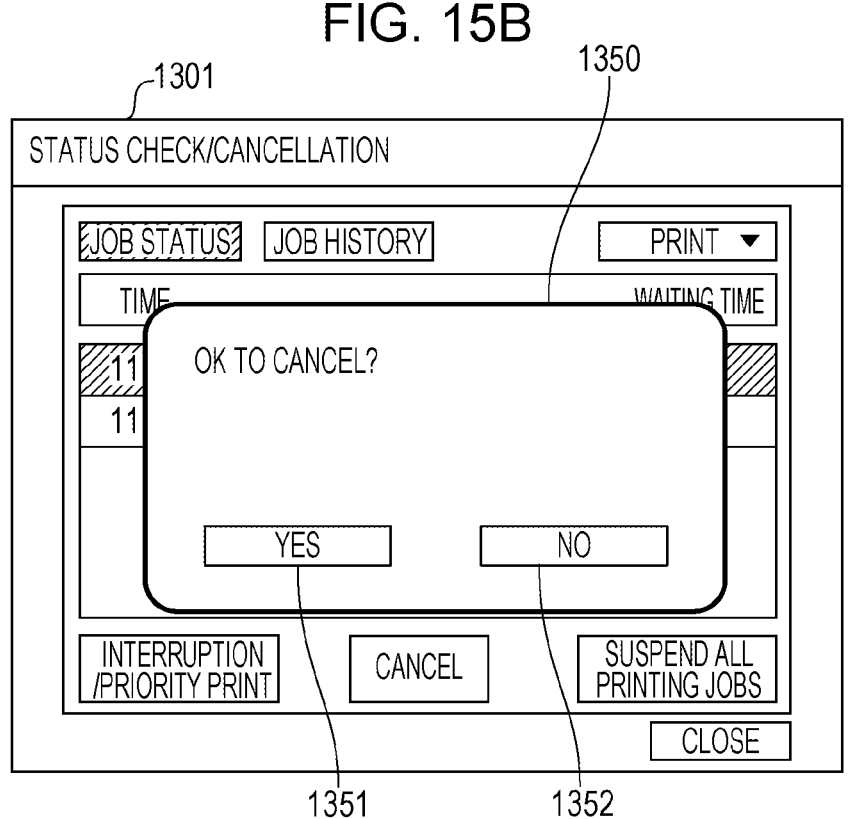

In a case where the tap operation on the "interruption/priority print" button 1306 is not performed, the status check/cancellation app 412 determines whether or not the tap operation on the "cancel" button 1307 is performed (S418). In a case where the tap operation on the "cancel" button 1307 is performed, a screen for confirming whether or not the selected job is to be cancelled is displayed on the display 122 (S419). FIG. 15B illustrates an example of the job cancellation confirmation screen. As illustrated in FIG. 15B, the cancellation confirmation screen 1350 is displayed while being overlapped with the "status check/cancellation" screen 1301. The "yes" button 1351 and the "no" button 1352 are arranged on the cancellation confirmation screen 1350. The "yes" button 1351 is a button for cancelling the currently selected job. The "no" button 1352 is a button for ending the job cancellation confirmation screen to be returned to the "status check/cancellation" screen 1301.

Next, the status check/cancellation app 412 determines whether or not the tap operation on the "no" button 1352 is performed (S420). In a case where the tap operation on the "no" button 1352 is performed, the status check/cancellation app 412 executes processing which will be described later in S423. In a case where the tap operation on the "no" button 1352 is not performed, the status check/cancellation app 412 determines whether or not the tap operation on the "yes" button 1351 is performed (S421). In S421, in a case where the tap operation on the "yes" button 1351 is not performed, the status check/cancellation app 412 returns the processing to S420. In a case where the tap operation on the "yes" button 1351 is performed, the status check/cancellation app 412 instructs the job processing unit 402 to cancel the job selected from the job list. The job processing unit 402 cancels the job in accordance with the instruction from the status check/cancellation app 412. After S418, the status check/cancellation app 412 closes the cancellation confirmation screen 1350 (S423). After the processing in step S419, the status check/cancellation app 412 returns the process to S402.

In a case where the tap operation on the "cancel" button 1307 is not performed, the status check/cancellation app 412 determines whether or not the tap operation on the "suspend all print jobs" button 1308 is performed (S424). In a case where the tap operation on the "suspend all print jobs" button 1308 is performed, the status check/cancellation app 412 determines whether or not the statuses of all the print jobs are suspended in the job processing unit 402 (S425). In a case where the statuses of all the print jobs are not suspended, the status check/cancellation app 412 instructs the job processing unit 402 to suspend all the print jobs (S426). The job processing unit 402 suspends the statuses of all the print jobs in accordance with the instruction from the status check/cancellation app 412. The status check/cancellation app 412 also holds information indicating that all the print jobs are currently suspended in the RAM 112 as a flag. After S426, the status check/cancellation app 412 returns the processing to S402.

In a case where the statuses of all the print jobs are suspended, the status check/cancellation app 412 instructs the job processing unit 402 to cancel the suspension of all the print jobs (S427). The status check/cancellation app 412 also cancels the flag indicating that all the print jobs held in the RAM 112 are suspended. After S422, the status check/cancellation app 412 returns the processing to S402.

In a case where the tap operation on the "suspend all print jobs" button 1308 is not performed, the status check/cancellation app 412 determines whether or not the stop key 306 is pressed (S428). In a case where the stop key 306 is pressed, the status check/cancellation app 412 executes the job cancellation processing described in FIG. 7A, FIG. 7B, and FIG. 7C (S112). In a case where the stop key is pressed on the main menu screen, the main menu app 411 executes the processing described in FIG. 7A, FIG. 7B, and FIG. 7C, but herein, the status check/cancellation app 412 executes the processing described in FIG. 7A, FIG. 7B, and FIG. 7C. In a case where the stop key 306 is pressed on the "status check/cancellation" screen 1301, the cancellation screen for selecting the job to be cancelled from the transmission job list is displayed on the display 122 similarly as in the main menu screen. In this manner, in a case where the stop key is pressed on the "status check/cancellation" screen 1301, the transmission job that is not to be suspended is displayed by priority over the transmission job that can be suspended. With the above-described configuration, the user can restrain the operation related to the cancellation of the transmission job that is not to be suspended.

In a case where the stop key is not pressed, the status check/cancellation app 412 determines whether or not the job is completed (S429). During the display of the "status check/cancellation" screen 1301, the job execution continues unless the user instructs to stop all the print jobs. For this reason, the execution of the job may end in some cases during the display of the "status check/cancellation" screen 1301. In a case where the status check/cancellation app 412 receives the job execution completion notification from the job processing unit 402 and determines that the job is completed.

In a case where the job is completed, the status check/cancellation app 412 updates the display contents of the job list 1305 from the job processing unit 402 (S430). It should be noted that, in a case where the display item selected before the update is also displayed in the job list 1305 after the update, the status check/cancellation app 412 displays the job list in a state in which this item is selected on the display 122.

Next, the status check/cancellation app 412 updates the display statuses of the respective buttons in conformity to the list after the update (S431). The processing contents of this step are equivalent to step S413. After this step, the status check/cancellation app 412 returns the processing to step S402 described above.

In a case where the completion notification of the job is not received, the status check/cancellation app 412 determines whether or not the tap operation on the "close" button 1309 is performed (S432). In a case where the tap operation on the "close" button 1309 is performed, the status check/cancellation app 412 ends the display of the "status check/cancellation" screen 1301 (S433). After this step, the status check/cancellation app 412 ends the processing in this flow chart. In a case where the tap operation on the "close" button 1309 is not performed, the status check/cancellation app 412 returns the processing to S402.

It should be noted that, with regard to the print job suspended in S2003 when the "job cancellation" screen 1401 is displayed, the suspension of the print job is cancelled in step S2213 when the "job cancellation" screen 1401 is closed. On the other hand, in a case where the print job is suspended by the press of the "suspend all print jobs" button 1308, the resumption is not performed when the "job cancellation" screen 1401 is closed. With the above-described configuration, the failure of the resumption of the print job when the "job cancellation" screen 1401 is closed can be avoided, and the resumption of the job which is unintended by the user can also be avoided.

As described above, according to the present exemplary embodiment, when the user presses the stop key 306 during the display of the copy screen 1101, the job cancellation screen (1150) in accordance with the job input in the copy app is displayed. Similarly, when the user presses the stop key 306 during the display of the screen (1201) of the transmission/FAX app 414, the job cancellation screen (1250) in accordance with the job input in the transmission/FAX app is displayed. That is, the cancellation screen dedicatedly used for the job input in each of the apps is displayed. A typical case where the job is cancelled includes a case where a mistake is noticed immediately after the job is input and the like. In the above-described case, since only the jobs input in the app are displayed, it becomes easier to select the cancellation target job, and an advantage is attained that the desired job can be promptly cancelled.

Furthermore, the transmission job list where the job is not suspended is displayed by priority over the print job list on the basis of a state in which the stop key is pressed on the "main menu" screen 1001 or the "status check/cancellation" screen 1301 which is different from the job setting screen. With the above-described configuration, it becomes easier to cancel the job that is not to be suspended by the user.

In addition, according to the present exemplary embodiment, it is possible to cancel the currently selected job when the "cancel" button 1307 arranged on the "status check/cancellation" screen 1301 is pressed. On the other hand, when the user presses the stop key 306 during the display of the "status check/cancellation" screen 1301, the "job cancellation" screen 1401 is displayed. While the screen is newly opened, the user who does not notice the presence of the "cancel" button 1307 can also cancel the job. On the other hand, the user who notices the "cancel" button 1307 can cancel the job by saving time and effort.

Other Exemplary Embodiments

As described above, the stop key 306 may be realized as a hard key or a soft key. When the stop key 306 is realized as the soft key, the stop, key is displayed at the same position on the display 122 with the same shape irrespective of the screen (1001, 1101, or the like) of the app to be displayed. With this configuration, even in a case where the user desires to promptly cancel the job, it becomes easier for the user to search for the stop key without hesitation.

In addition, when the stop key is displayed by using the soft key, the shape, the color, or the like may be changed in accordance with the job type set as the cancellation target, or the job type that can be cancelled may be displayed on the stop key. With this configuration, it is possible to clearly inform the user of the job set as the cancellation target.

According to the present exemplary embodiment, the descriptions have been made while the processing when the stop key is pressed is executed by the respective applications. An application dedicated to the stop key may be arranged, and in accordance with the screen displayed when the stop key is pressed, the application dedicated to the stop key may switch the type of the job displayed on the cancellation screen. For example, the cancellation list of only the copy job is displayed in advance at the time of the display of the "copy screen" 1101, and the cancellation screen where the jobs of all types can be cancelled is displayed at the time of the display of the "main menu" screen 1001. The image processing apparatus 100 stores the type of the screen and the type of the job to be displayed in the ROM 113 while being associated with each other. The stop key app detects the press of the stop key and discriminates the type of the screen displayed at that time on the display 122. The stop key app reads out the job type associated with the discriminated type of the screen from the ROM 113. Then, the stop key app may obtain the job list of the job type read out from the ROM 113 from the job processing unit 402 and display the job list on the display.

As described above, in a case where the stop key is pressed during the display of the screen for setting the setting value of the job, the image processing apparatus displays the screen where only the job of the job type in which the setting value can be set on the above-described screen is set as the cancellation target. On the other hand, in a case where the stop key is pressed on a certain screen different from the screen for setting the setting value of the job, the image processing apparatus displays the list of the transmission jobs. With the above-described configuration, in a case where the stop key is pressed on the certain screen different from the job setting screen, it is possible to display the screen where the transmission job that is not to be suspended can be promptly cancelled.

The user may press the stop key in a state in which the main menu screen, which is to be displayed while the image processing apparatus stands by or immediately after the login processing, is displayed in some cases. For example, the above-described case includes a case where the user presses the start key to start the job and then temporarily leaves a place in front of the image processing apparatus and the like. In order for the user to cancel the job, when the user comes back to the place in front of the image processing apparatus, the main menu screen is displayed on the display.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:
    a scanner configured to read an original;
    a transmission interface configured to transmit image data to an external apparatus;
    a printer configured to print an image;
    a display configured to display the image; and
    a controller having one or more processors which executes instructions stored in one or more memories, the controller being configured to:
        cause the display to display a transmission job list in response to accepting a selection of a stop key for stopping a job in a state where the image forming apparatus has a transmission job which is to be executed by the transmission interface and a first screen for execution of the transmission job is displayed,
        cause the display to display a print job list in response to accepting the selection of the stop key in a state where the image forming apparatus has a print job which is to be executed by the printer and a second screen for execution of the print job is displayed, and
        cause the display to display the transmission job list in response to accepting the selection of the stop key in a state where the image forming apparatus has the transmission job and the print job and a predetermined screen which is different from the first screen and the second screen is displayed.

2. The image forming apparatus according to claim 1, wherein the controller is further configured to cause the display to display the transmission job list in response to accepting the selection of the stop key in the predetermined screen in a state where the image forming apparatus has the transmission job and does not have the print job.

3. The image forming apparatus according to claim 1, wherein the controller is further configured to cause the display to display the print job list in response to accepting the selection of the stop key in the predetermined screen in a state where the image forming apparatus has the print job and does not have the transmission job.

4. The image forming apparatus according to claim 1, wherein the predetermined screen is a screen which is capable of transitioning to the first screen or the second screen.

5. The image forming apparatus according to claim 4, wherein the predetermined screen is a main menu screen.

6. The image forming apparatus according to claim 1, wherein the displayed transmission job list includes only the transmission job.

7. The image forming apparatus according to claim 1, wherein the displayed print job list includes only the print job.

8. The image forming apparatus according to claim 1, wherein the controller is further configured to, in response to a transmission job displayed in the first screen for execution of the transmission job having been selected and a cancellation key for canceling a job having been selected, delete the selected transmission job.

9. The image forming apparatus according to claim 1, wherein the controller is further configured to, in response to a print job displayed in the second screen for execution of the print job having been selected and a cancellation key for canceling a job having been selected, delete the selected print job.

10. The image forming apparatus according to claim 1, wherein the controller is further configured to resume the job which has been stopped via the stop key in response to accepting an instruction for ending the display of the transmission job list or the print job list.

11. The image forming apparatus according to claim 1, wherein the controller is further configured to cause the display to display the transmission job list and the print job list in a switchable manner.

12. The image forming apparatus according to claim 1, wherein the controller is further configured to cause the display to display a screen notifying a user that there is no job in response to accepting the selection of the stop key in a state where the image forming apparatus does not have the transmission job and the print job and the predetermined screen is displayed.

13. The image forming apparatus according to claim 1, wherein the transmission job list is a list displaying a job name of a job of which a type is a transmission job, the job name being obtained from the one or more memories.

14. The image forming apparatus according to claim 1, wherein the print job list is a list displaying a job name of a job of which a type is a print job, the job name being obtained from the one or more memories.

15. The image forming apparatus according to claim 1, wherein the print job is a copy job.

16. An image forming apparatus comprising:
    a scanner configured to read an original;

a transmission interface configured to transmit image data to an external apparatus;

a printer configured to print an image; and an operation device capable of accepting a user operation and displaying the image, the operation device being configured to:

display a transmission job list in response to accepting a selection of a stop key for stopping a job in a state where the image forming apparatus has a transmission job which is to be executed by the transmission interface and displays a first screen for execution of the transmission job, display a print job list in response to accepting the selection of the stop key in a state where the image forming apparatus has a print job which is to be executed by the printer and displays a second screen for execution of the print job, and display the transmission job list in response to accepting the selection of the stop key in a state where the image forming apparatus has the transmission job and the print job and displays a predetermined screen which is different from the first screen and the second screen.

17. The image forming apparatus according to claim 16, wherein the operation device is further configured to display the transmission job list in response to accepting the selection of the stop key in the predetermined screen in a state where the image forming apparatus has the transmission job and does not have the print job.

18. The image forming apparatus according to claim 16, wherein the operation device is further configured to display the print job list in response to accepting the selection of the stop key in the predetermined screen in a state where the image forming apparatus has the print job and does not have the transmission job.

19. The image forming apparatus according to claim 15, wherein the predetermined screen is a screen which is capable of transitioning to the first screen or the second screen.

20. The image forming apparatus according to claim 19, wherein the predetermined screen is a main menu screen.

21. The image forming apparatus according to claim 16, wherein the displayed transmission job list includes only the transmission job.

22. The image forming apparatus according to claim 16, wherein the displayed print job list includes only the print job.

23. The image forming apparatus according to claim 16, wherein the operation device is further configured to cause the display to display the transmission job list and the print job list in a switchable manner.

24. The image forming apparatus according to claim 16, wherein the operation device is further configured to cause the display to display a screen notifying a user that there is no job in response to accepting the selection of the stop key in a state where the image forming apparatus does not have the transmission job and the print job and the predetermined screen is displayed.

25. The image forming apparatus according to claim 16, wherein the print job is a copy job.

26. A control method for an image forming apparatus comprising a scanner configured to read an original, a transmission interface configured to transmit image data to an external apparatus, a printer configured to print an image and a display configured to cause the display to display the image, the control method comprising:

displaying a transmission job list in response to accepting a selection of a stop key for stopping a job in a state where the image forming apparatus has a transmission job which is to be executed by the transmission interface and a first screen for execution of the transmission job is displayed, displaying a print job list in response to accepting the selection of the stop key in a state where the image forming apparatus has a print job which is to be executed by the printer and a second screen for execution of the print job is displayed, and displaying the transmission job list in response to accepting the selection of the stop key in a state where the image forming apparatus has the transmission job and the print job and a predetermined screen which is different from the first screen and the second screen is displayed.

27. The control method according to claim 26, wherein the print job is a copy job.

* * * * *